`US009451316B2`

(12) United States Patent
Leong et al.

(10) Patent No.: US 9,451,316 B2
(45) Date of Patent: Sep. 20, 2016

(54) METHOD AND SYSTEM FOR USING HIERARCHICAL METADATA FOR SEARCHING AND RECORDING CONTENT

(71) Applicant: The DIRECTV Group, Inc., El Segundo, CA (US)

(72) Inventors: Peter Leong, Cupertino, CA (US); Bo Huang, Redondo Beach, CA (US); Heather N. Truong, Anaheim, CA (US); Ruben D. Lechuga, Palos Verdes Peninsula, CA (US); Joshua N. Snow, Los Angeles, CA (US); Michael E. Depies, Lawndale, CA (US); Roshan Menon, San Pedro, CA (US); Neil McIver, Llandudno (GB)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/454,653

(22) Filed: Aug. 7, 2014

(65) Prior Publication Data
US 2015/0052559 A1 Feb. 19, 2015

Related U.S. Application Data

(60) Provisional application No. 61/866,732, filed on Aug. 16, 2013.

(51) Int. Cl.
*H04N 5/445* (2011.01)
*H04N 21/431* (2011.01)
(Continued)

(52) U.S. Cl.
CPC ........ *H04N 21/4312* (2013.01); *G06F 3/0482* (2013.01); *G06F 17/30112* (2013.01); *G06F 17/30997* (2013.01); *H04N 21/4332* (2013.01); *H04N 21/482* (2013.01); *H04N 21/4825* (2013.01); *H04N 21/4826* (2013.01); *H04N 21/4828* (2013.01); *H04N 21/8133* (2013.01); *H04N 21/431* (2013.01); *H04N 21/435* (2013.01); *H04N 21/4334* (2013.01); *H04N 21/462* (2013.01); *H04N 21/4668* (2013.01)

(58) Field of Classification Search
CPC ..................... H04N 5/44543; H04N 21/4532; H04N 21/47214
USPC .................................. 386/46; 725/45–46, 58
See application file for complete search history.

(56) References Cited

U.S. PATENT DOCUMENTS

| | | | |
|---|---|---|---|
| 2002/0092022 A1 | 7/2002 | Dudkicwicz et al. | |
| 2004/0001690 A1* | 1/2004 | Boston et al. | 386/46 |

(Continued)

OTHER PUBLICATIONS

International Search Report and Written Opinion dated Sep. 30, 2014 in International Application No. PCT/US2014/050634 filed Aug. 12, 2014 by Peter Leong et al.

*Primary Examiner* — Sumaiya A Chowdhury
(74) *Attorney, Agent, or Firm* — Harness, Dickey & Pierce, P.L.C.

(57) ABSTRACT

A user device for storing or displaying content recommendations includes a search session manager receiving metadata associated with content. The metadata includes a received hierarchical identifier including a primary level and a secondary level unique to the primary level. A memory stores selected hierarchical identifiers. A search module compares the received hierarchical identifiers with the selected hierarchical identifiers. A screen display displays content from at least one of the primary level and secondary level based on comparing.

19 Claims, 41 Drawing Sheets

| (51) | Int. Cl. | |
|---|---|---|
| | G06F 3/0482 | (2013.01) |
| | G06F 17/30 | (2006.01) |
| | H04N 21/482 | (2011.01) |
| | H04N 21/81 | (2011.01) |
| | H04N 21/433 | (2011.01) |
| | H04N 21/435 | (2011.01) |
| | H04N 21/462 | (2011.01) |
| | H04N 21/466 | (2011.01) |

(56) References Cited

U.S. PATENT DOCUMENTS

| | | | |
|---|---|---|---|
| 2006/0026635 A1 | 2/2006 | Potrebic et al. | |
| 2006/0026647 A1* | 2/2006 | Potrebic et al. | 725/53 |
| 2006/0088276 A1* | 4/2006 | Cho et al. | 386/46 |
| 2007/0250864 A1 | 10/2007 | Diaz Perez | |
| 2008/0065659 A1 | 3/2008 | Watanabe et al. | |
| 2009/0070710 A1 | 3/2009 | Kagaya et al. | |

* cited by examiner

| Sport | Organization League | Conference Division Tournament | Division Conference | Subdivision |
|---|---|---|---|---|
| Auto Racing | FIA | Formula 1 | - | - |
| Basketball | NBA | Western | Pacific | - |
| Football | NCAA | Division 1 | Big Ten | Legends |
| Golf | PGA | Masters | - | - |
| Soccer | UEFA | EPL | - | - |
| Tennis | ATP | Wimbeldon | - | - |

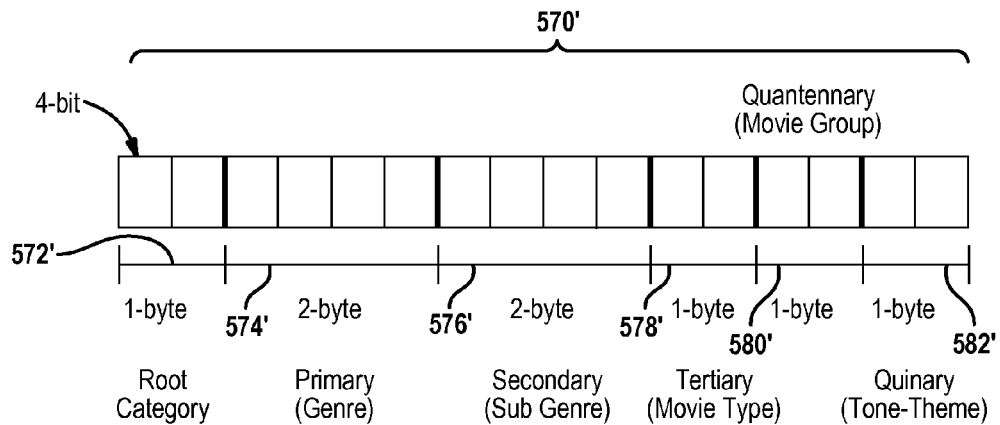

FIG. 5B

| Genre | Sub Genre | Movie Type | Movie Group | Theme |
|---|---|---|---|---|
| Action | Western | Western Traditional | Outlaw (Gunfighter) | Courage |
| Comedy | Situational Comedy | Teen Comedy | - | - |
| Drama | Family Relationship | Coming of Age | Coming of Age Period | Compassion |
| Horror | Supernatural Horror | Supernatural Horror Creepy | - | - |
| Sci. Fiction | Sci Fi Action | Sci Fi Action Robot | - | - |
| Thriller | Mystery/Crime | Crime Thriller | Crime Thriller Tense | - |

FIG. 6B

Hierarchical id = 010001400002000000 — 710 FIG. 7A

Hierarchical id = 010001400002010000 — 712 FIG. 7B

Hierarchical id = 010001400020200000 — 714 FIG. 7C

Team id = "294" Pistons FIG. 7D

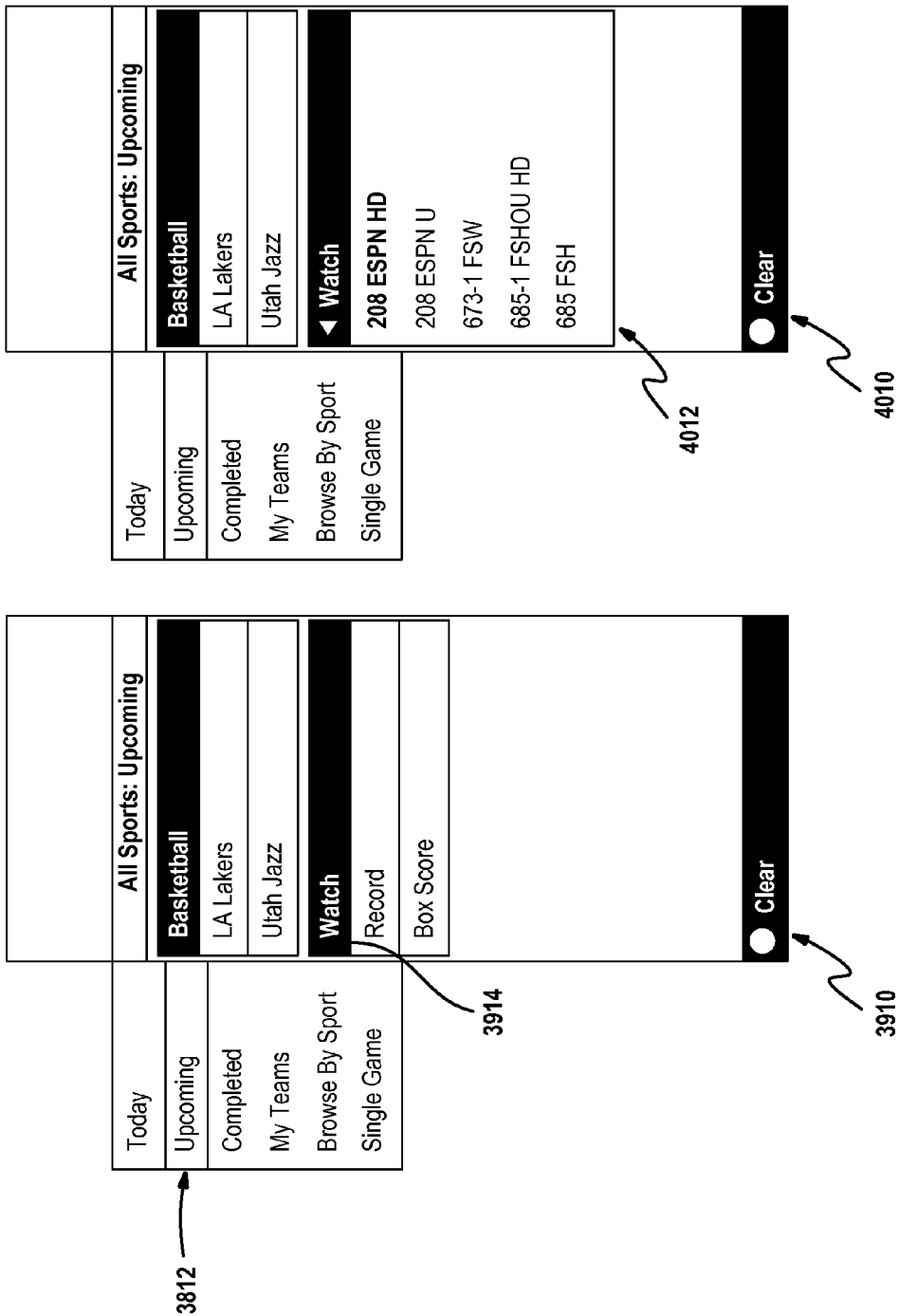

METHOD AND SYSTEM FOR USING HIERARCHICAL METADATA FOR SEARCHING AND RECORDING CONTENT

TECHNICAL FIELD

The present disclosure relates to a content communication system and, more specifically, to a method and system to allow faster and more accurate display of desired content using hierarchical metadata.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content.

While providing a large amount of content to consumers is desirable, it is also desirable to allow the consumers to easily find programming to view. Currently, a program guide provides a graphical representation of the content or program events available to a user. A program guide is typically a list of programs, times, and channels for the various content. Only a limited amount of guide material may be displayed on the screen at one time. Thus, the program guide, while useful, becomes a slow way of finding desirable content in a large amount of available content.

Searching by key words is another method for providing content results to users. However, because of the volume of materials set top boxes may have significant time associated with a search. Searching takes place by sorting through all the available content entries. This can take a significant amount of time.

Key word searching can also result in numerous extra program results. When searching for a live DETROIT TIGERS game using key words, for example, not only will a live event appear in the results but the pre-game and post-game shows, replays of games and the like will also appear. Most often the live games are of interest.

Oftentimes, users are concerned with a particular league, division or sub-division of a league. Further searching for all games within a category using key word is typically not accurate. For example, searching for all BIG TEN games in the EAST Division would result in little or no results because program names are not categorized in that way.

The processing resources within a set top box are also somewhat limited. Therefore, providing a search that generates results more quickly and accurately is desirable.

SUMMARY

The present disclosure provides a system and method for searching program events and displaying and recording content in an efficient manner for the user to quickly find desirable content.

In one aspect of the disclosure, a method includes receiving metadata associated with content at a user device, said metadata comprising a received hierarchical identifier comprising a primary level and a secondary level unique to the primary level, storing selected hierarchical identifiers at the user device, comparing the received hierarchical identifiers with the selected hierarchical identifiers at the user device and generating a screen display on a display associated with the user device displaying content from at least one of the primary level and secondary level based on comparing.

In another aspect of the disclosure, a method includes receiving metadata associated with content at a user device, said metadata comprising a received hierarchical identifier comprising a primary level and a secondary level unique to the primary level, storing selected hierarchical identifiers at the user device, comparing the received hierarchical identifiers with the selected hierarchical identifiers at the user device and recording content at the user device corresponding to at least one of the primary level and secondary level based on comparing to form recorded content.

In yet another aspect of the disclosure, a user device for storing or displaying content recommendations includes a search session manager receiving metadata associated with content. The metadata includes a received hierarchical identifier including a primary level and a secondary level unique to the primary level. A memory stores selected hierarchical identifiers. A search module compares the received hierarchical identifiers with the selected hierarchical identifiers. A screen display displays content from at least one of the primary level and secondary level based on comparing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5B is a representation of a hierarchical identifier for a movie example according to the present disclosure.

FIG. 6B is a chart illustrating hierarchical levels for the movie example.

FIGS. 7A-7C are examples of hierarchical identifiers.

FIG. 7D is a representation of a team identifier.

FIG. 39 is a screen display for watching a team in MY TEAMS memory.

FIG. 40 is a screen display for selecting a channel when multiple channels are available for a MY TEAMS selection.

DETAILED DESCRIPTION

Figure 1:
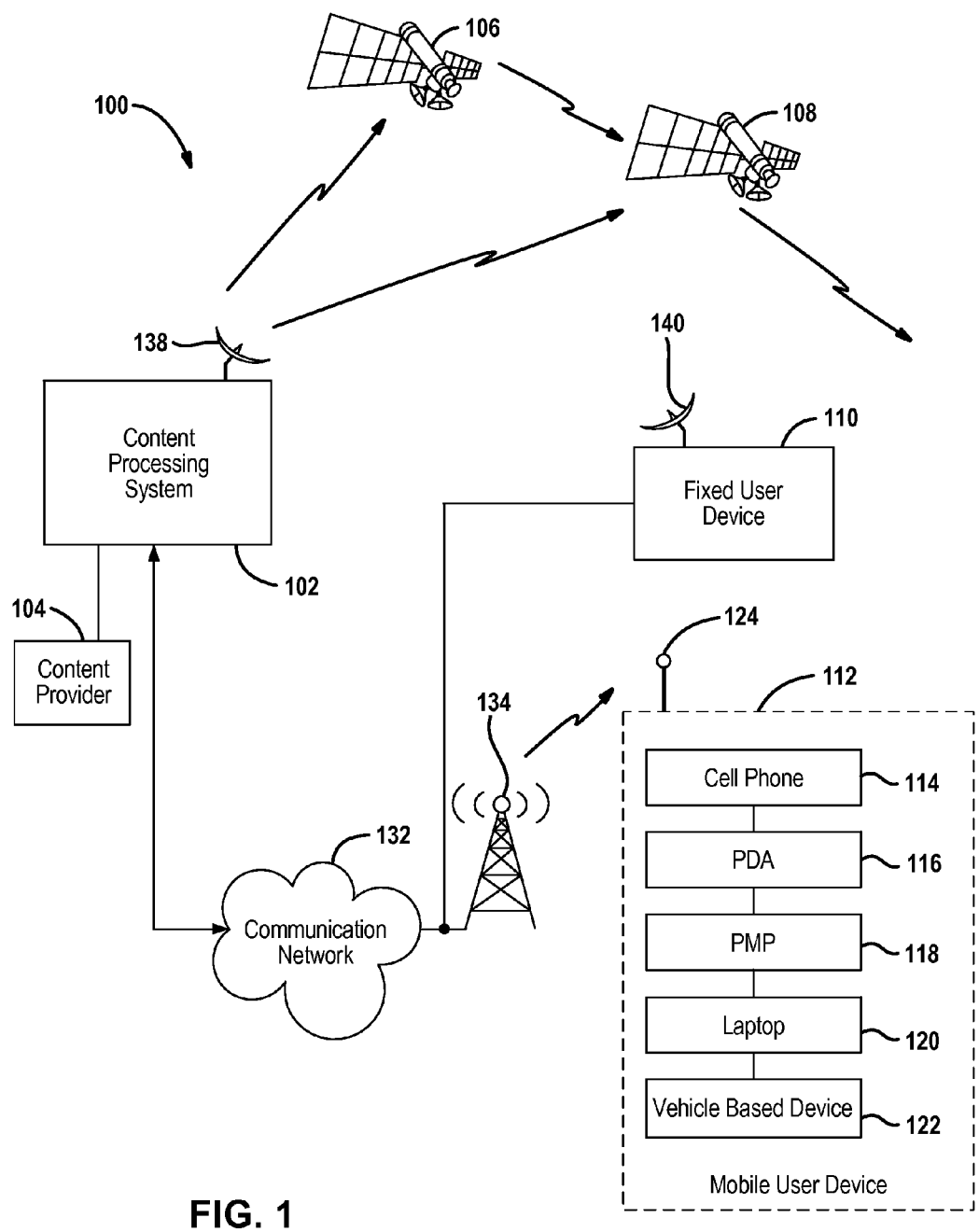
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. Insert detailed description.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

The following disclosure is made with respect to the delivery of sports-related content. The following description is applicable to other systems including movies, games or the like. The hierarchical identifiers set forth herein apply to movies, genres, sub-genres and specific sub-classification levels. A specific example is set forth below. The following description also presented team identifiers and hierarchical identifiers. These identifiers may be numeric or alpha-numeric identifiers. The numeric or alpha-numeric identifiers may correspond to team descriptors and hierarchical level descriptors. The hierarchical level descriptors may have different descriptions for each of the various levels of the hierarchical identifier. The descriptors are textual descriptors that are displayed on a screen display to allow the user to easily identify the team or the hierarchical level desired. Essentially, the team identifier and hierarchical identifier are used "behind the scenes" and the team descriptor and hierarchical level descriptors are used at the user interface or menu level.

The selectors described below are used for selecting various levels or changing a screen display in the menu structure. A selector may be selected by interacting with a user interface associated with the user device.

Referring now to FIG. 1, a content communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as but not limited to, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Data and content or both are provided to content processing system 102 from the content provider 104. The data or content may be transmitted, for example, via an uplink antenna 138 to the satellites 106,108, one or more of which may be a geosynchronous or geo-stationary satellite, that, in turn, rebroadcast the information over broad geographical areas on the earth that include the user devices 110, 112. The satellites may have inter-satellite links as well. Among other things, the example content processing system 102 of FIG. 1 provides program content and data related to program events to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. A carousel of multiple program material may be scheduled within the content processing system 102 whereby the satellites 106, 108 may be used to communicate metadata and other program guide content and programming content to the user devices 110, 112. The repetition rate and blocks of content and metadata may vary. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset may be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
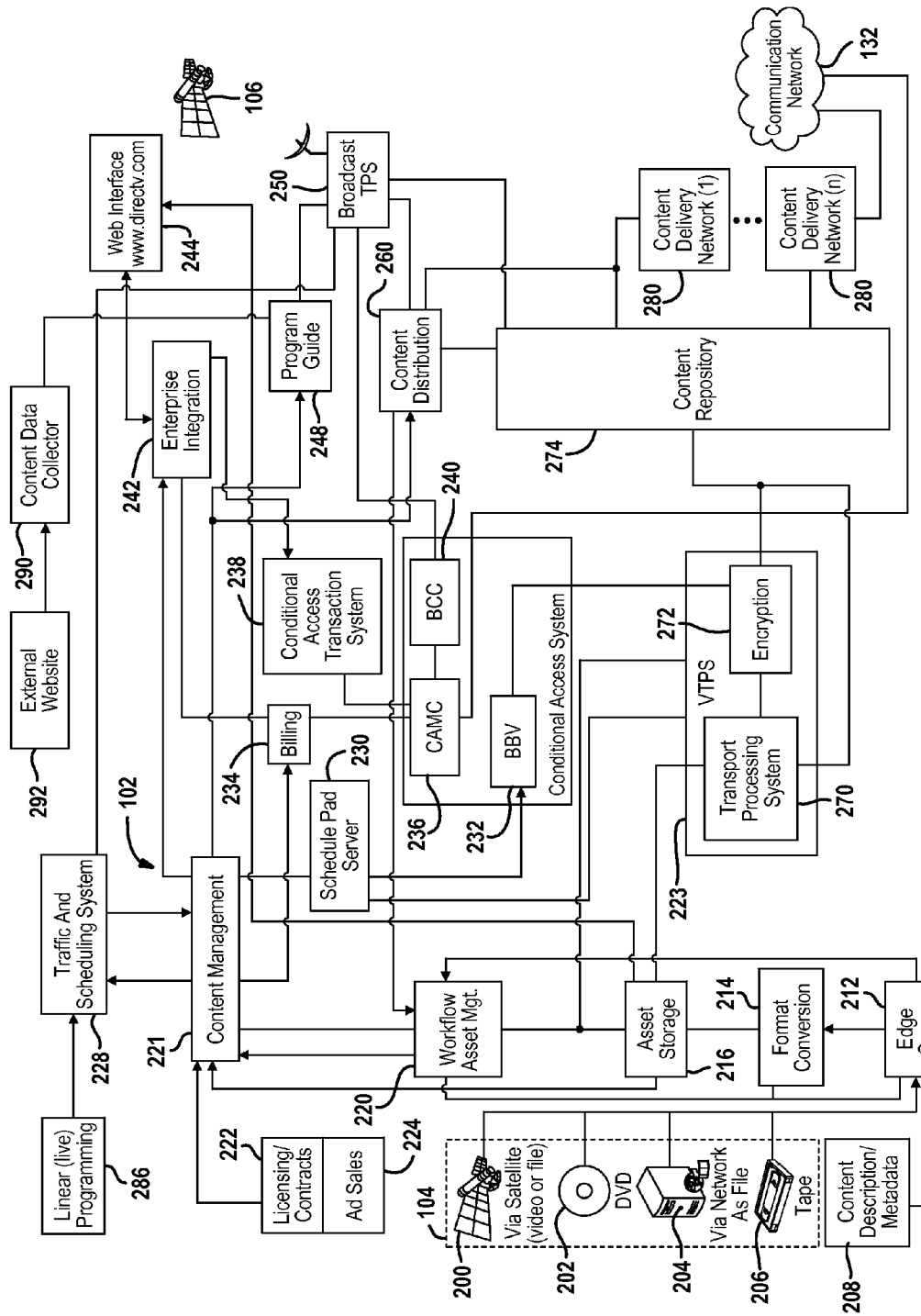
FIG. 2 is a detailed block diagrammatic view of the content processing system of FIG. 1.

Referring now to FIG. 2, the content processing system 102 of FIG. 1 is illustrated in further detail. The content provider 104 may include various types of content providers, including those that provide content by way of a satellite 200, digital versatile disc (DVD) 202, via a network as a file in 204, by way of tapes and other means. The content provider 104 may also provide graphics, content description, and other metadata 208 to the system.

The metadata 208 may also be generated and stored locally in the content processing system 102. For example, a team identifier, hierarchical identifier and their corresponding descriptors may be generated locally. The team identifiers and the hierarchical identifiers and their use will be described in detail below. In general, a team identifier is an alpha-numeric identifier used to identify a specific sports team. For example, the DETROIT TIGERS may have the team identifier 0013. The descriptor is DETROIT TIGERS. A hierarchical identifier is a single identifier with multiple levels. Each level is unique to the prior level. The hierarchical identifier may be used in sporting and non-sporting environments. In a sporting environment a sport identifier, the organization identifier, the conference, division or tournament, the division or conference and the subdivision may all be coded into different bytes of the hierarchical identifier.

The team identifier and the hierarchical identifier may be generated from other metadata and using personal review of current and future programming. The team identifier may also be associated with a hierarchical identifier. For example, the DETROIT PISTONS may be associated with the Eastern conference of the National Basketball Association.

The content providers 104 may be various types of content providers and provide various types of content including advertising content.

Another area of the content processing system 102 is an input server 212 that receives the various content and converts the format in a format conversion system 214. A house format asset storage server 216 may be used to store the content asset in a house format. Still image files, trailers, posters, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packet. The encoder may encode the data according to the CableLabs® Video-on-Demand (VoD) encoding specification MD-SP-VOD-CEP-I01-040107 (i.e., performs asset encoding). The encoded data is then packetized into a stream of data packets by the transport processing system 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102. The content management 221 may also assign material identifications to the various received content. The material identification may utilize the asset identifier such as a program identifier (PID) in the metadata as well as the provider ID. Content, posters and other received information may be assigned related material identifications to make them easier to associate and retrieve. For example, different suffixes may be used to identify related content with the remainder of the material identification being the same.

Licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A traffic and scheduling system 228 is used to provide the requested channel, program associated data (PAD), channel information and program information packets (PIPs). The traffic and scheduling system 228 may schedule content processing for a plurality of received assets based on a desired program lineup to be offered by the communication system 100. This may include both on-demand programming and linear programming 286. For example, a live TV program for which a high demand for reruns might be expected could be assigned a high priority for content processing. The linear programming 786 provides live broadcasts through the satellite.

A schedule PAD server (SPS) 230 may be coupled to the workflow system and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 are charged for subscription services and/or asset downloads (e.g., On-Demand or PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Record requests may also be provided from the conditional access transaction system 238. A conditional access system broadcast control center (BCC) 240 may be used to generate a conditional access packet from the information from the conditional access system 236.

The billing system 234 may generate purchase data that is provided to the enterprise integration (EI) block 242. The enterprise integration block 242 may generate record requests to the conditional access transaction system 238. Record requests may be generated through a web interface 244 such as DIRECTV.com®. Various ordering information, such as ordering broadband (on-demand) video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Content data such as, but not limited to, titles, descriptions, actor names, biography data, various content categories (e.g., comedy, family) and metadata from the content management system 221 may be provided to the advanced program guide (APG) module 248 as a key word. The content data or metadata may include team identifiers, the hierarchical identifier, the team identifier descriptors and hierarchical identifier descriptors. The program guide module 248 may be coupled to a satellite broadcasting system such as a broadcast transport processing system 250 that broadcasts linear, on-demand content and guide data including metadata to the users through the satellite 106, 108.

The program guide data generated by the program guide module 248 may include content data signals that are communicated to a user device and is used to generate a display of guide information to the user, wherein the program guide may be a grid guide and informs the user of particular programs that are broadcast on particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs. The program guide data may also be used to generate an event table to enable a reduced time search.

Content data such as titles, descriptions and categories may also be provided from the content management system 221 to the content distribution system 260. Content files and metadata may be controlled by the content distribution system 260.

Various types of container or data objects may be used to communicate the program guide content to the user devices. The container objects may be formed and/or communicated through the program guide module 248. For example, a program object (PO) may be used to communicate data that may include, but is not limited to, team identifier, hierarchical identifier, category, sports descriptors, title, rating, description, name, credit, related shows, pay-per-view price, studio, and the like. A channel object (CO) may communicate frequency, category rating, network, channel name, event start time, event end time and number. A schedule object (SO) may schedule a 24-hour block bridge between the channel and the program. The channel video-on-demand object or broadband catalog object (BCO) may also be provided and provide the list of content and data to be displayed in the video-on-demand categories. Such content may be communicated using a broadband network rather than the satellite system. The categories and the contents of the categories will be further described below. Another type of object is a boot event object (BEO). The boot event object is an object that provides schedule data in a similar manner to the schedule object described above. Typically the boot event objects are a smaller set of data that is used when the set top box is booting up. The boot event objects are used so that the set top box may populate the program guide as quickly as possible and provide a reasonable set of initial events. Typically, boot event objects provide about two hours of events starting with currently available data. Once the set top box has been booted, the set top box uses schedule objects or other objects to supplement the data provided by the boot event object.

A graphics object (GO) may also be used to communicate sports metadata and configuration data. Graphics object may include posters and logos for various sports teams. The graphics may be ultimately displayed on the various menu screens for selection and display of content. XML sports data may be received in the graphics object.

The video transport processing system 223 may include a transport packaging system 270. The transport packaging system 270 creates pre-packetized unencrypted files that are stored in the content repository 274. An encryption module 272 receives the output of the transport packaging system and encrypts the packets. Fully packaged and encrypted files may also be stored in the content repository 274. Encryption may take place in the data portion of a packet and not the header portion.

One or more content delivery networks 280*a-n* may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

The content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hypertext transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

Security of assets available by way of the content delivery network may also be established. Control word packets for each broadcast-encrypted asset or content file may be provided to the content delivery network. Encryption may also be provided.

The broadcast transport processing system 250 may provide various functions, including encoding, packetizing, encrypting, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, program guide information or assets asset files, menus structures etc.) and/or live (linear) content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

A content data collector 290 may also be associated with the content processing system 102. The content data collector 290 may be a separate resource or be included within the content processing system 102. The content data collector 290 may be used to collect various types of data about content from an external website or websites 292. The external website 292 is an external source of data that is provided to the content data collector 290. The content data collector 290 may search for content on an external website 292 about various content titles, actors within the content titles, descriptions, filmography and content related to the content titles. In the present example, the external websites may be entertainment websites, sports websites, or various other types of websites. By way of example, the content data collector 290 may search for various terms such as teams, organizations, content titles, actors, or other data. The external websites 292 may also provide information as to predict ratings for various programming. One example of a website for data is Tribune Media Services (TMS) ON® service. The content data collector 290 may be in communication with the program guide module 248 which communicates the program guide content as well as other data to the various user devices. Hierarchical identifiers, team identifiers and related data may be obtained from the content data collector 290.

Figure 3:
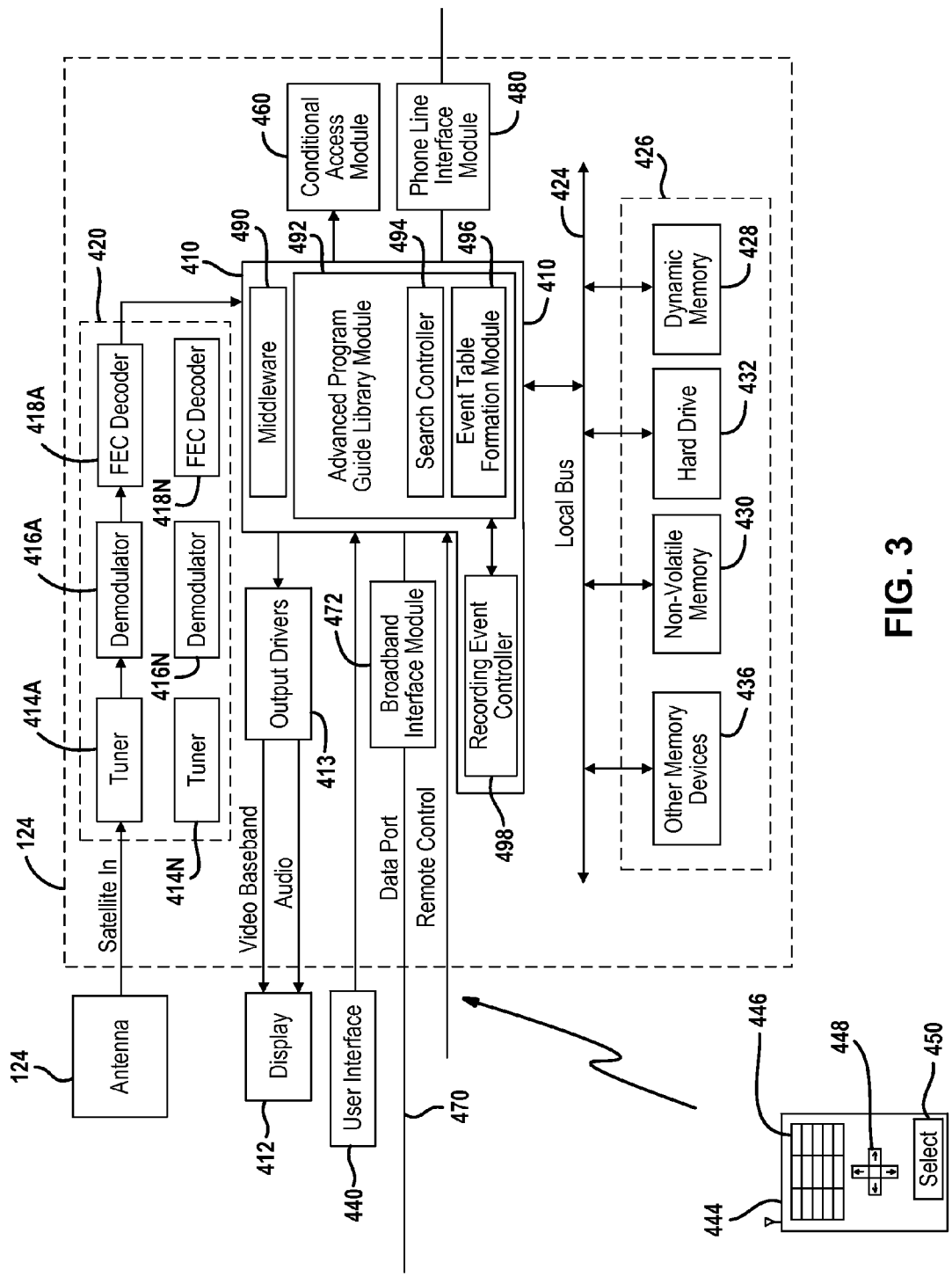
FIG. 3 is a detailed block diagrammatic view of the user device of FIG. 1.

Referring now to FIG. 3, a user device 110 such as a fixed user device is illustrated by way of example. A similar configuration for a mobile user device may also be used. The fixed user device may include the fixed antenna 124. If the user device is a mobile user device, the antenna 124 may be a rotating antenna that is used to track the relative movement of the satellite or an omni-directional antenna that may receive antenna signals from various directions.

The user device 110 may include a controller 410. The controller 410 may control various operations as will be described below. The user device 110 may be in communication with a display 412 through output drivers 413. The output drivers 413 may generate desired audio and video output formats suitable for the particular display 412.

The controller 410 may be a general processor such as a microprocessor. The controller 410 may be used to coordinate the control and the functions of the user device. These functions may include the functions of a receiving circuit 420. The receiving circuit 420 may include a tuner 414, a demodulator 416, a forward error correction decoder 418 and any buffers or other functions. More than one tuner, demodulator and FEC decoder may be provided as indicated by the reference numerals "A" and "N". One example four tuners, demodulators and decoders may be used, although various numbers of tuners, demodulators and decoders may be provided depending upon the system requirements. The tuner 414 receives the signal or data from the broadcast channel. The signal may include programming content or different types of data including program guide data having metadata. The demodulator 416 demodulates the signal to form a demodulated signal or demodulated data. The decoder 418 decodes the demodulated signal to form a decoded data or decoded signal.

The controller 410 may also be coupled to a local bus 424. The local bus 424 may be used to couple a memory 426, including a dynamic memory 428, such as random access memory (RAM) which changes often and whose contents may be lost upon the interruption of power or boot up. The bus 424 may also be coupled to a non-volatile memory 430. One example of a non-volatile memory is an electrically erasable programmable read only memory (EEPROM). One specific type of EEPROM is flash memory. Flash memory is suitable since it is sectored into blocks of data that may be individually erased and rewritten.

A hard drive 432 may also be in communication with the local bus 424. The hard drive 432 may act as a digital video recorder for storing video, data such as program guide data, metadata and content. The hard drive 432 may also be interchangeable with another memory device with a large capacity.

The various data stored within the memory 426 may include metadata such as team identifies, hierarchical identifiers, tables with textual names or descriptors for the team identifiers and the hierarchical identifiers, titles, actors, directors, descriptions, posters, identifiers, event start times, event end times, availability start times, availability end times, pricing data, timing data, program guide data, event tables, internal data regarding tuning, search recording and watching recorded content and various other types of data.

Other memory devices 436 may also be coupled to the local bus 424. The other memory devices may include other types of dynamic memory, non-volatile memory, or may include removable memory devices. The display 412 may be changed under the controller 410 in response to data in the dynamic memory 428 or non-volatile memory 430.

The controller 410 may also be coupled to a user interface 440. The user interface 440 may be various types of user interfaces such as a keyboard, push buttons, a touch screen, a voice activated interface, or the like. The user interface 440 may be used to select a channel, select information such as search criteria, change the volume, change the display appearance, or other functions. The user interface 440 may be used in addition to a remote control device 444. The remote control device 444 may include a keypad 446, an arrow keypad 448, and a select button 450. Inputs to the user device 110 may be provided by the remote control device or through the user interface 440.

A conditional access module card 460 (CAM) may also be incorporated into the user device 110. Access cards, such as a conditional access module, may be found in DIRECTV® units. The access card 460 may provide conditional access to various channels and wireless signals generated by the system. The access card 460 may control the decryption of program content. Not having an access card or not having an up-to-date access card 460 may prevent the user from receiving or displaying video and other content from the system.

The controller 410 may also be in communication with a data port 470. The data port 470 may be a broadband data port that is coupled to the controller 410 through a broadband interface module 472. The broadband interface module 472 may allow wireless or wired communication between external devices with the controller 410. The controller 410 through the broadband interface module 472 may communicate with the internet and various systems such as the head end of the content communication system. Callback signals may be provided through the broadband interface module 472 from the controller 410.

The controller 410 may also be in communication with a phone link interface module 480. The phone link interface module 480 may couple the user device 110 to a public switched telephone network (PSTN). The user device 110 may generate callback signals to the head end through the phone interface module 480.

Callback signals are provided through the broadband interface module 472 and the phone interface module 480.

The controller 410 may include middleware 490. The middleware 490 is an application used to interface with the inputs from user interfaces (as selected by a user) and communicate with an advanced program guide library module 492. The middleware 490 may receive search results and generate screen displays for displaying the search results or search results screen displays to a user associated with the user device 110.

An advance program guide library module 492 in this example is used to perform the actual searches and generate event table. Of course, standalone modules may also be used. The advance program guide module 492 may include a search controller 494 and an event formation module 496. The details of the search controller 494 and the event table formation module 496 will be further described below. In general, the search controller 494 is used for performing various functions including searching event tables and obtaining other content search data after searching the event table is performed. The searching may be performed using various such criteria including but not limited to a team identifier, hierarchical identifiers, time limitations, or channel subscription limitations and combinations of the above.

The event table formation module 496 is used to generate event tables from the various received container objects. The event table formation module 496 is searchable by event times such as start times and end times. As will be described below, search windows associated with various events may be used to allow the search controller 494 to rapidly find search results. Typically, current broadcasting programming or programming airing soon will be on interest first, and ultimately will be displayed first.

The recording event controller 498 is used for recording various events and content that corresponds to the hierarchical identifier or the team identifier, or both. Recording event controller 498 may receive the formation data from the event table formation module 496 or search results from the search controller 494 based upon user selected team identifiers. The selected identifiers and metadata received identifiers are compared. When the user selected identifiers the corresponding received team identifier or received hierarchical identifier, content may be recorded or displayed in response thereto at the user device. Content is recorded by storing the content within a memory such as the hard drive 432 of the user device. In other words, when a user selected team identifier matches received identifiers, the user device may record the content matching the 432. For hierarchical identifiers, when one of the levels of the hierarchical identifier corresponds to previously entered hierarchical selected by the user, the content may also be recorded. Ultimately, the list of stored content is displayed to the user selection menu to playback the recorded or stored content obtained by the user selected team identifier or the user selected hierarchical identifier.

Figure 4:
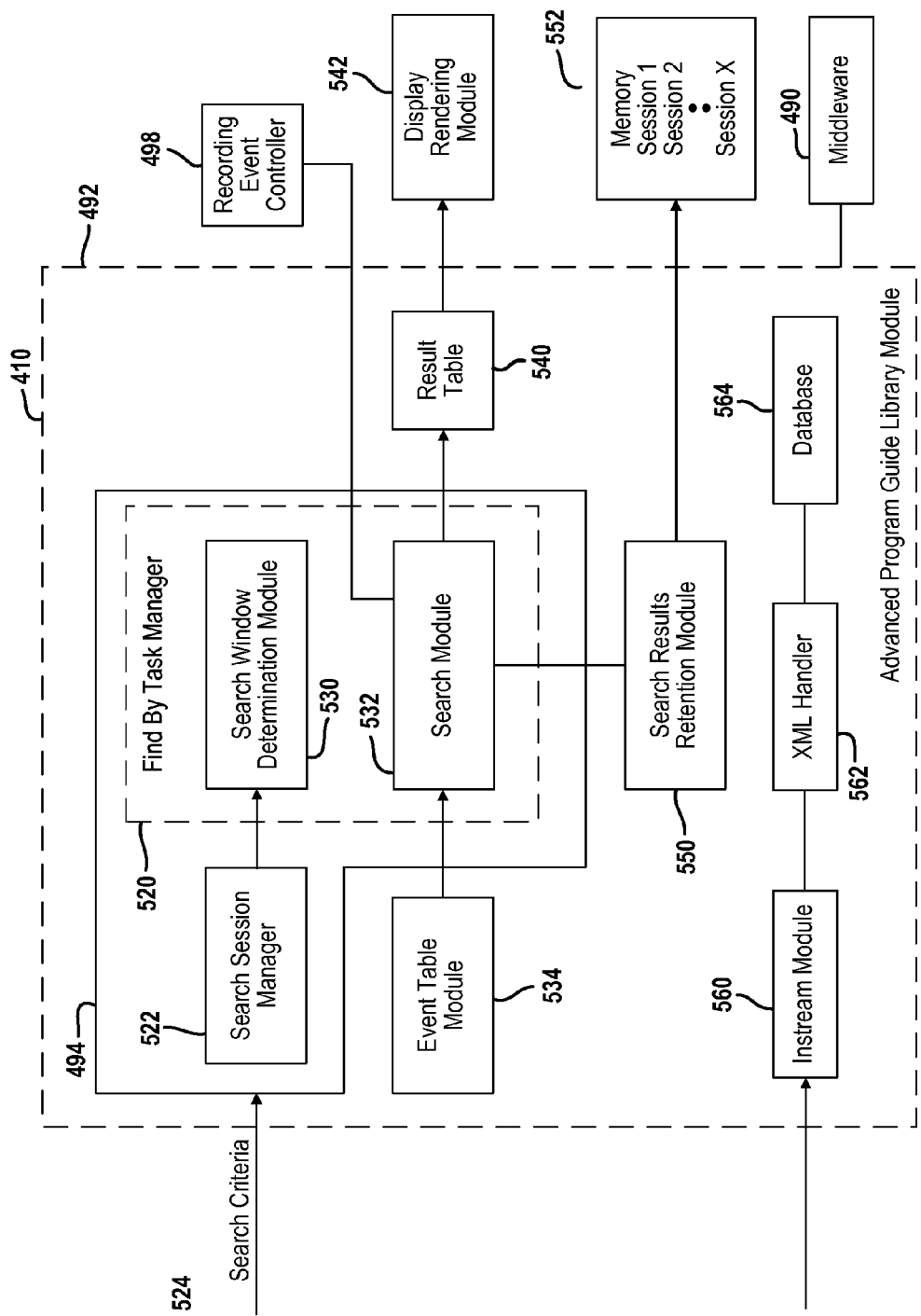
FIG. 4 is a block diagrammatic view of the search module in relation to the receiving circuit and the memory.

Referring now to FIG. 4, the search controller 494 is illustrated in further detail. The search controller 494 is disposed within the advanced program guide library module 492. As mentioned above, the advance program guide library module 492 receives container objects and generates a program guide in response thereto. Also, the advance program guide library module 492 may be used for performing searches for various events which may be referred to as find by tasks. A find by task manager 520 performs the actual searches. A search session manager 522 is used to control the initiation of a search session and communicating the search session results to the middleware 490. The search session manager 522 also receives search criteria 524 that are used by the find by task manager 520 to perform the actual search. In this example, the team identifiers and the hierarchical identifiers may be set as the search criteria. As mentioned above, the subscriber channels may also be used.

A search window determination module 530 is included within the search by task manager 520. The search window determination module 530 determines a search window based upon the search criteria and the type of content corresponding to the search criteria. Typically, a user enters the content desired or preselects the identifiers to be searched by making selections using a user interface associated with the user device. DIRECTV® currently has a "What's On Now" selection for linear content. "What's On Now" refers to content that will be available in the next half-hour time slot and beyond. A MY TEAMS section may also be incorporated in a search menu.

The find by task manager 520 includes a search module 532 that is used to perform the actual search. The search module 532 searches the event table module 534 for event table contents. The formation of the event table will be described further below. The event table module provides an abbreviated listing that is searchable based upon time. By providing time-based listings, the search window determined in the search window determination module 530 may be used to quickly limit the amount of searching performed. The output of the search module 532 comprises search results that are stored within a result table 540. The result table 540 is disposed within the advance program library module 492. However, other types of storage for the result tables such as in the memory 426 of FIG. 3 may also be performed.

To generate a display corresponding to the result table 540, a display rendering module 542 is set forth. The display rendering module 542 formats the display for the user on a user display.

A search results retention module 550 is used to coordinate the retention of the search results in a memory 552. The memory 552 may be part of the memory 526 described above. The memory 552 may store various search sessions from various screens as well as content to be recorded.

The advance program guide library module 492 may also include an instream module 560 that is used to obtain new versions of metadata. An XML handler 562 is used to parse the new files. The handler 562 may update a database or memory with new data and notify the middleware 490 of such changes. The handler 562 may also be in communication with the search module 532 which is used to update the different sports or sports teams into the search module in this example.

Figures 5A, 6A:
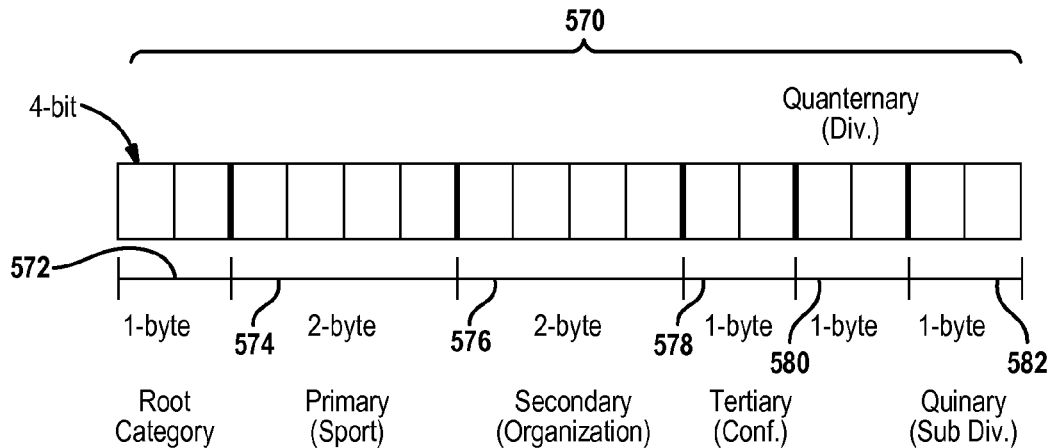
FIG. 5A is a representation of a hierarchical identifier for a sports example according to the present disclosure.
FIG. 6A is a chart illustrating hierarchical levels for the sports example.

Referring now to FIG. 5A, a representation of a hierarchical identifier 570 is illustrated for sports. In this example, a root category is illustrated as one byte with two four bit sections. The root category may correspond to high level categories such as sports, movies or the like. The root category is illustrated by reference numeral 572. A primary category, 574, may be a general category that depends on the root category 572. A primary sport category may, for example, be, but not limited to, auto racing, basketball, football, golf, soccer, and tennis. In this example, the primary category is two bytes.

Under the primary category, 574, a secondary category 576 is set forth. In this example, the secondary category or level also depends directly from and is dependent upon the primary category or level. The secondary level in a sports context may be the organization, such as the NBA.

Under the secondary level another level referred to as the tertiary level 578 is set forth. The tertiary level is unique to the secondary level. The tertiary level 578 in a sports context may be the conference such as the Western division. Under the tertiary level 578, a quaternary level 580 may be set forth. The quaternary level 580 may correspond to a division level such as the Pacific division. The quaternary level 580 is unique to the tertiary level 578.

Under the quaternary level the quinary level 582 may correspond to a subdivision of a particular division or a conference. The quinary level 582 is unique to the quaternary level 580.

Referring now to FIG. 5B, a representation of a hierarchical identifier 570' is illustrated. In this example, the root category 572' corresponds to movies. The remaining portions of the hierarchical identifier 570' have the same number of bytes as that illustrated above in FIG. 5A. However, the levels themselves are changed. It should be noted that the number of bytes for the different categories may also be changed depending upon the root category. The secondary level 576' corresponds to sub-genre. The tertiary level 578' corresponds to movie type. The quaternary level 580' corresponds to movie group and the quinary level 582' corresponds to tone or theme.

Referring now to FIG. 6A, a table 610 corresponding to examples of the various levels of data for sports that may be included within a hierarchical identifier is set forth. The table includes descriptors that correspond directly to levels of the hierarchical identifiers. Column 612 on the left represents a primary level. Column 612 represents a secondary level. Column 616 represents a tertiary level. Column 618 represents a quaternary level. Column 620 represents a quinary level.

In the first row, auto racing may be the sport, formula one may be the organization or league. In the second row, basketball is the sport, the NBA is the league and the Western conference is the conference. In the third row, football is the sport and the league is NCAA, the division may be division one, the conference may be the Big 10 conference and the sub-division may be the Legends division. Golf may have an organization of the PGA and the tournament may be the Masters tournament. Soccer may have the league of UEFA and the sub-division EPL. Tennis may have the organization as ATP and the tournament as Wimbledon. Some sports may not have conferences or divisions but various tournaments may be set forth with individual identifiers. Each of the columns illustrated in the table 610 may represent the various levels starting with the sport or primary level 574 of FIG. 5. The transition between the textual wording illustrated in the table 610 may be performed by a hierarchical table. The textual descriptors or descriptors that are of the various levels may be implemented in numerals.

Referring now to FIG. 6B, a table 610' corresponding to examples of various levels of data for movies may be included within a hierarchical identifier is set forth. In this example, column 612' corresponds to the primary level 574' in FIG. 6B. The sub-genre corresponds to the secondary level 576'. The movie type column 616' corresponds to the tertiary level 578'. The fourth column 618' for movie group corresponds to the quaternary level 580' and the fifth column 620' corresponds to the quinary level and corresponds to tone or theme.

The rows in table 610' are set forth for an example. Other examples may be evident to those skilled in the art. In this example, the first row contains the genre action, sub-genre Western, movie type Western traditional, movie group outlaw (gun fighter) and a theme of courage. The second row has a genre of comedy, a sub-genre of situational comedy, a movie type of teen comedy, no movie group and no theme. The third row has a genre of drama, a sub-genre family relationship, a movie type of "coming of age," a movie group of coming of age period, and a theme of compassion. The fourth row contains the genre of horror, the sub-genre of supernatural horror, a movie type of supernatural horror creepy and no movie group or theme. The fifth row has a genre of science fiction, a sub-genre of science fiction action, a movie type of science fiction action robot and no movie group or theme. The last row has a genre of thriller, a sub-genre of mystery/crime, a movie type of crime/thriller and a movie group of crime/thriller tense and no theme.

The tables set forth in FIGS. 6A and 6B may be structured or changed based upon different sports and movie groups.

Referring now to FIG. 7A, hierarchical identifiers for the NBA is set forth. The identifiers may be used for identification by the head end as well as by the user device. Hierarchical identifier 710 is shown as "01004002000000." This refers to the NBA. That is, the root category is sports, which are the first two bytes. The next four bytes "004" corresponds to the actual sport, such as basketball. The next three pairs of bytes are left blank meaning the hierarchical ID 710 refers to the organization level of National Basketball Association.

In FIG. 7B, hierarchical identifier 712 is identical to hierarchical identifier 710 for the Sport and League levels. For the division level, a secondary or conference is set forth. "01" Refers to the Eastern conference of the National Basketball Association.

Referring now to FIG. 7C, the division has been changed from the Eastern division to the Western division. Represented by "02." By using the hierarchical identifiers, all National Basketball Association games may be displayed or recorded using the hierarchical ID set forth in 710 in FIG. 7A. If only the Eastern conference of the National Basketball Association is desired, the hierarchical identifier 712 may be used. If only the Western conference of the National Basketball Association is of interest, hierarchical identifier 714 is set forth.

Referring now to FIG. 7D, a team identifier 294 corresponding to the Detroit Pistons is set forth. One thing to note about the identifiers is that a numerical identifier is set forth for each textual content descriptor. The Detroit Pistons team may also be associated with the hierarchical identifier 712 because they are in the Eastern conference of the NBA. The association of the hierarchical identifier and the team identifier is useful in allowing the user to select the desired team for the selection screen displays as set forth below. Should a team move, the numerical identifier may remain the same. Only the text may be required to be changed. When a team moves, the automatic recordings associated with the team may not be required to be changed.

Figure 8:
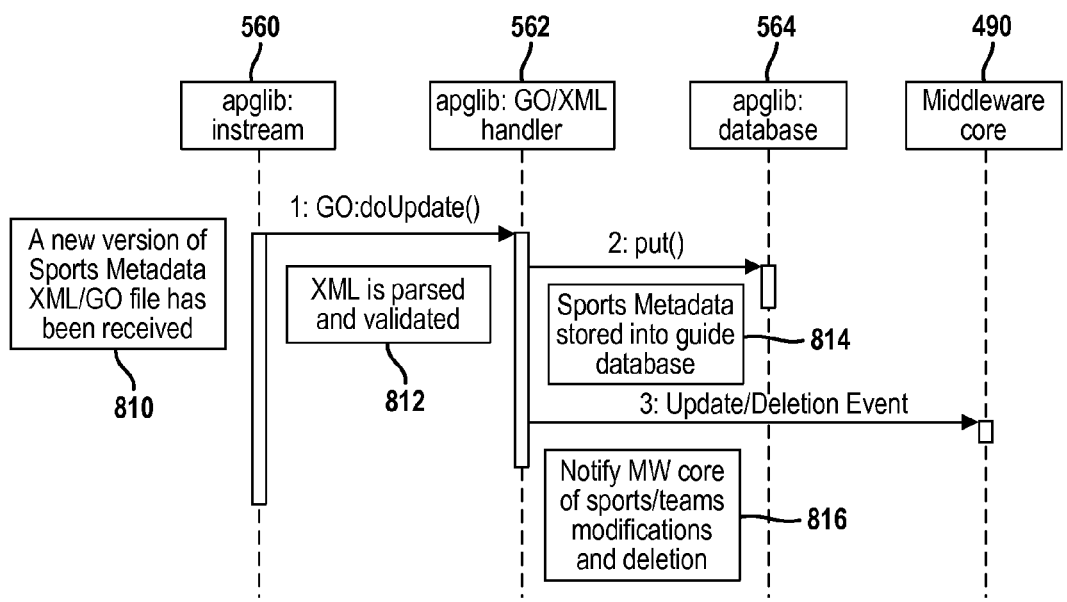
FIG. 8 is a flow diagram of a method for receiving sports metadata.

Referring now to FIG. 8, a method for ingesting content is set forth. Step 810 set forth a new version of the metadata which has been received at the user device. In step 812, the document is parsed and validated at the handler 562. In step 814, the updated metadata or new metadata is stored into the database 564. The middleware core 490 is notified of the modifications and deletions in step 816.

Figure 9:
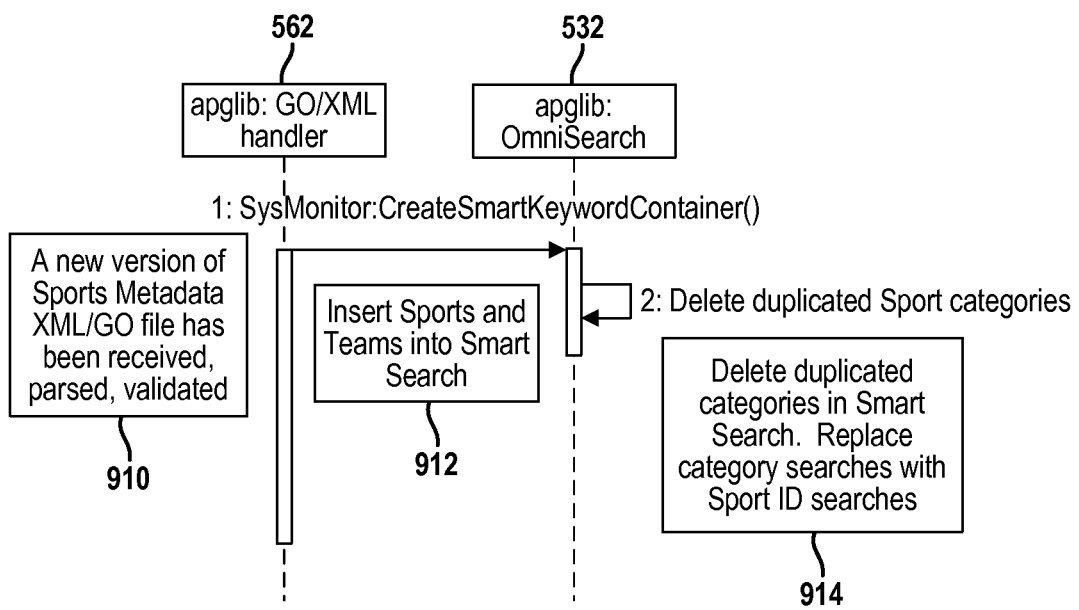
FIG. 9 is a flow chart of a method for updating updated metadata.

Referring now to FIG. 9, updated metadata may also be incorporated into the search module 530. In step 910 a new version of sports metadata may be received, parsed and validated at the handler 562. Sports teams are inserted into the searching capability in step 912 at the search module 532. Search module 532 may delete duplicate categories in the smart search and replace the category searches with sports ID searches in step 914. It should be noted that various index tables may be used to perform the search updates. Textual tables for screen displays to the end user corresponding to the actual texts of the team names and level names in the hierarchical IDs may also be stored.

Figure 10:
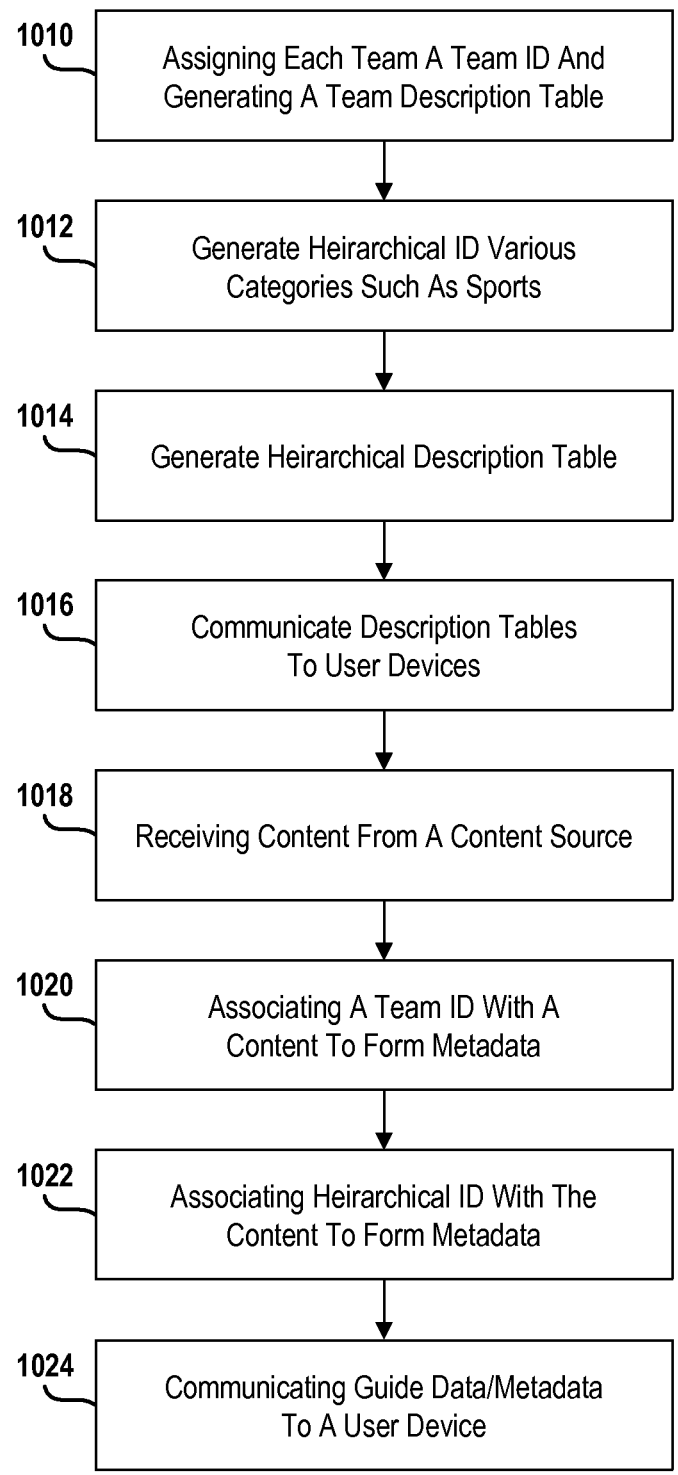
FIG. 10 is a flow chart of a method for communicating guide data and metadata to a user device.

Referring now to FIG. 10, a method of forming the team identifier is set forth. In step 1010 each team is assigned a team identifier and a team descriptor table or index is used to link the two together. The team descriptor table corresponds to each numerical identifier to a textual description of the team. Various sporting teams and various sports may be represented in the team description table with team identifiers.

In step 1012 the hierarchical ID values and various categories such as sports are generated. The hierarchical identifiers are multi-level identifiers that have a value in each level that is unique to the parent or previous level. The hierarchical identifier is a single identifier with multiple levels. In the present example a numerical hierarchical identifier is set forth. In step 1014, the hierarchical identifiers correspond to a textual description table which is generated in step 1014. In step 1016, the description tables are communicated to the user devices. Both the hierarchical description table and the team description tables are communicated to the user devices. This may be performed in various ways, including through the satellite or through a broadband connection.

In step 1018, content is received from a content source. Content is received at the head end or content processing system. In step 1020, the team identifier is associated with content to form metadata. This may be performed at the content processing system or prior to receiving the content at the content processing system. In step 1022, the hierarchical identifier is also associated with the content to form metadata. Thus, the metadata may include various data including the team identifier and the hierarchical identifier. In step 1024, the guide data, which may include the metadata, is communicated to a user device. The metadata becomes received at the user device.

Figure 11:
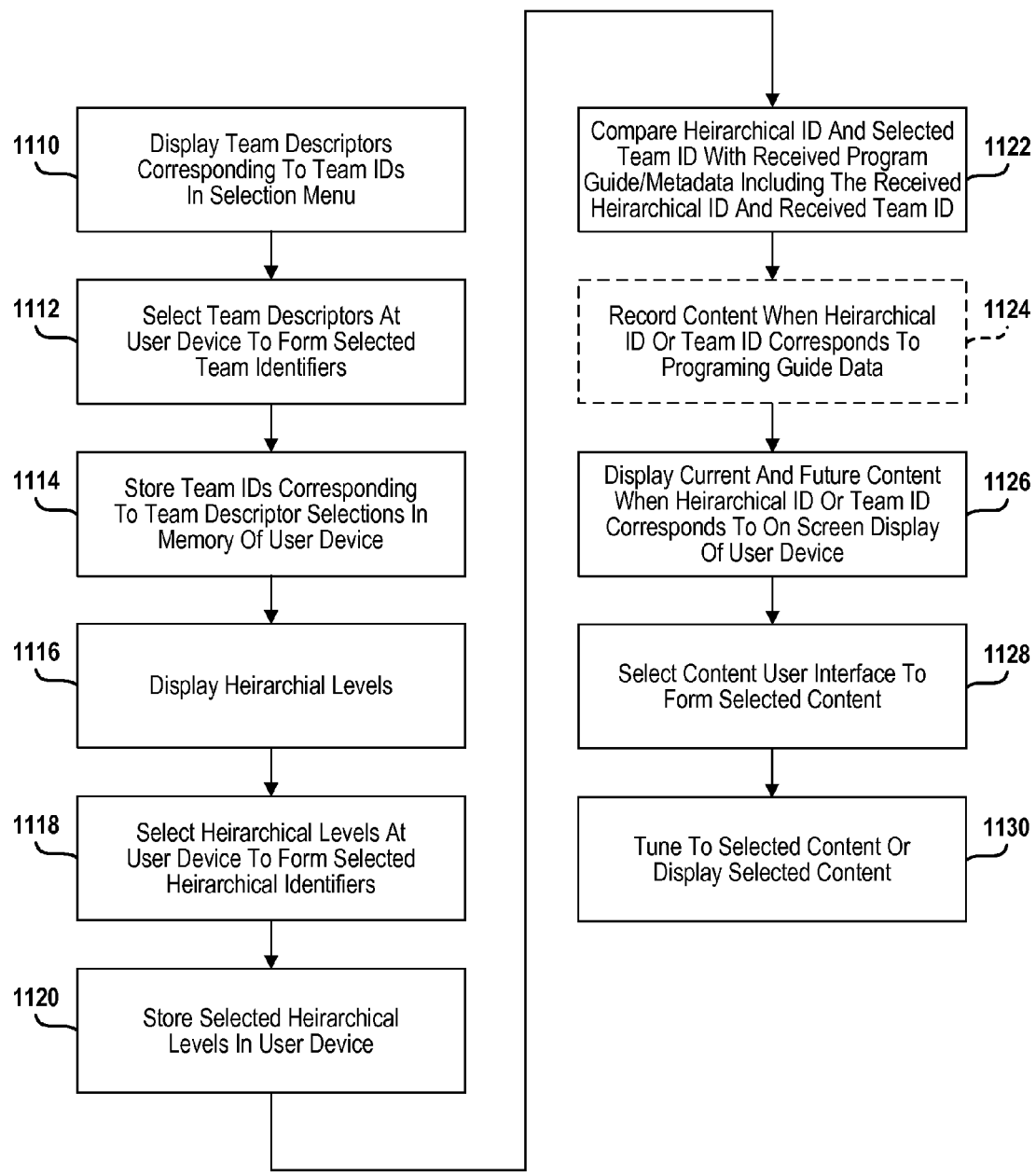
FIG. 11 is a flow chart of a method for using team identifiers and hierarchical identifiers.

Referring now to FIG. 11, a method for using the team identifiers and hierarchical identifiers is set forth. In step 1110, the team identifier descriptors corresponding to the team identifiers are displayed in a selection menu. In step 1112, team identifier descriptors are selected at the user device to form selected team identifiers using a user interface. In the present example, a remote control may be used to form team selections by moving a cursor or other indicator along a screen display on a television associated with a user device. In step 1114, the selected team identifiers are stored in the memory of the user device. Various numbers of teams from various sports may be selected.

The user may also wish to select various hierarchical levels corresponding to hierarchical identifiers. In step 1116, various hierarchical levels may be selected. The levels each correspond to a textual name, which in turn corresponds to a portion of a hierarchical identifier. In step 1118, the hierarchical levels are selected by the user device. By way of example, the user may be interested in only certain sports, such as football, and only certain levels of football, such as the Legends division in the Big 10. In step 1120 the selected hierarchical levels are stored in the user device.

In step 1122, the selected hierarchical identifier and the selected team identifier are compared with the program guide data metadata. The received metadata corresponds to content. In step 1124, content corresponding to the selected hierarchical ID and/or the team ID may be recorded within the user device. This step is an optional step that may be selected by the user upon selecting the hierarchical identifier and the team identifier.

When the received team identifiers and received hierarchical identifiers are compared to the selected team identifiers and the selected hierarchical identifiers, current and future content corresponding to the comparisons may be generated in step 1126. In step 1126, the recorded content or current and future content may be displayed on the screen device in a list. As will be described below, the list may consist of a plurality of posters to visually communicate the substance of the content.

In step 1128, the displayed content may be selected using a user interface of the user device to form selected content. A selection cursor or the like may be moved around the screen display. In step 1130, the selected content may be tuned to or displayed based upon a selection. Present content currently being played or broadcasted may be tuned. Content recorded within the user device may be displayed based upon the selection. In any event, the user is able to view the desired content for the desired hierarchical level or team immediately. Various menus and sub-menus may be set up to perform these functions. In the following example, a sports functionality is described.

Figure 12:
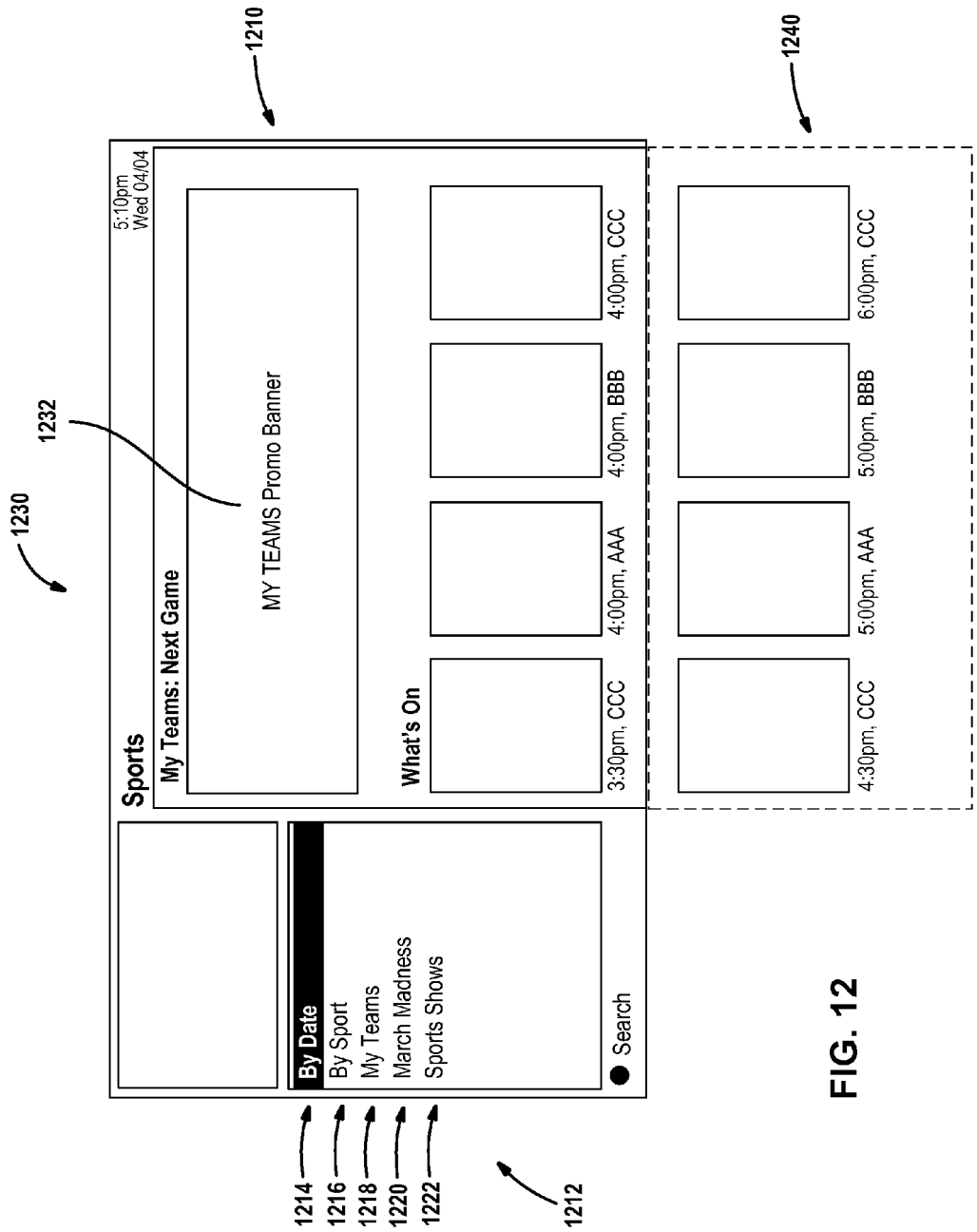
FIG. 12 is a representation of a screen display for promoting "MY TEAMS."

Referring now to FIG. 12, the present example of a screen display for a sports-based system is set forth. The screen display 1210 is described as a landing page. The landing page 1210 may have various portions for selection in the left column 1212. In this example, the sports selections may correspond to a date selection 1214, a sports selection 1216, a MY TEAMS selection 1218, a March Madness selection 1220 or a sports show section 1222. By selecting one of the titles 1214-1222 particular content may be displayed for the user in the display window 1230. The March Madness selection 1220 may be seasonal. The display window 1230 may include a promotional banner 1232. The posters 1234 correspond to programming that is currently being broadcasted and may be immediately tuned to by the user of the user device. Content that is on later in time may be displayed below the currently available content in row 1240. Scrolling the screen upwards displays the row 1240 and beyond. The promotional banner 1232 may promote the MY TEAM section and encourage the user to select teams for display in the MY TEAMS section. Once the teams are selected, a logo or the like may be generated in this area.

Figure 13:
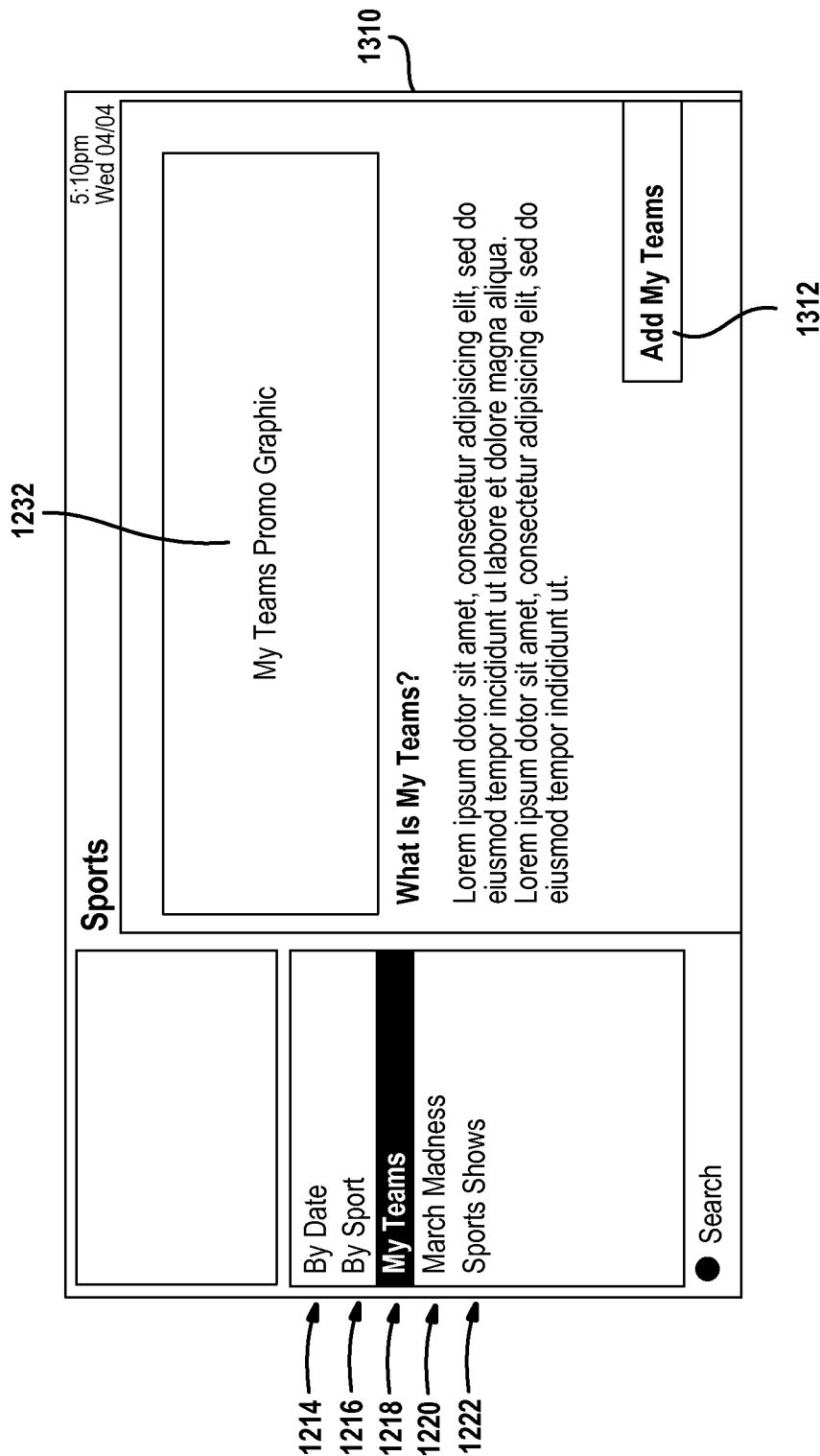
FIG. 13 is a screen display for entering a "MY TEAMS" selection.

Referring now to FIG. 13, a screen display 1310 is displayed after the "MY TEAMS" selector 1218 is selected in FIG. 12. The screen display 1310 may include an "add MY TEAMS box" 1312 used for allowing the user to add teams to the MY TEAMS identifiers. By selecting button 1312, the user is taken to another screen for the selections.

Figure 14:
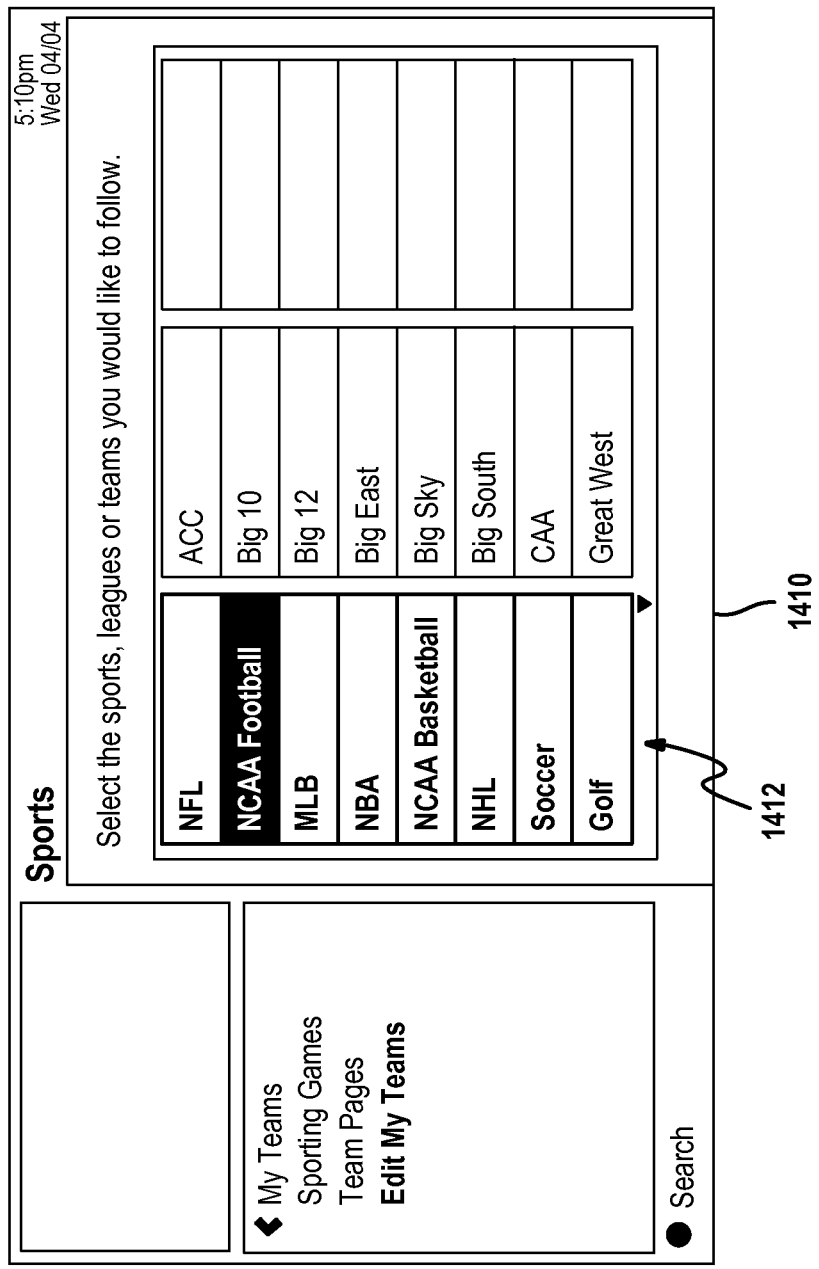
FIG. 14 is a first screen display for selecting hierarchical identifiers or for a screen display.

Referring now to FIG. 14, after selecting the "add MY TEAMS" button 1312, a sports selection screen display 1410 may be illustrated. In this example, various sports, leagues or teams may be selected. In the present example, a selections list 1412 includes NFL, NCAA football, Major League Baseball, National Basketball Association, National Collegiate Athletic Association Basketball, National Hockey League, Soccer and Golf. An arrow selector 1414 may be used to scroll down to other sports selections. In screen display 1410, high levels of the hierarchical identifiers are evident.

Figure 15:
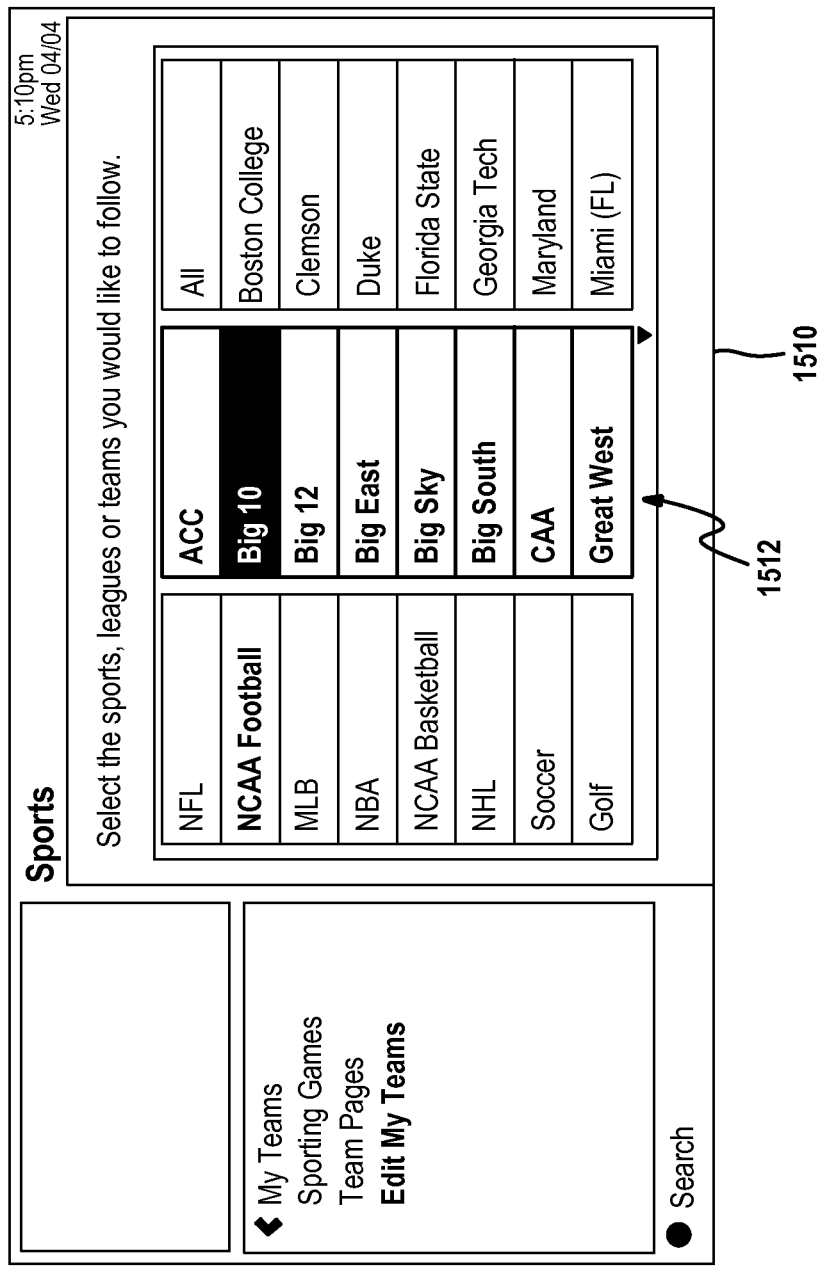
FIG. 15 is a second screen display for a different hierarchical level.

Referring now to FIG. 15, when "NCAA football" is selected from FIG. 14, a list of the divisions within NCAA football is set forth. Football is a primary level. NCAA is a secondary level. In this example, the ACC, Big 10, Big 12, Big East, Big Sky, Big South, the CAA, and Great West conferences are all set forth in the list 1512 of the screen display 1510. As mentioned above, the user may highlight various content so that the hierarchy level is added to the memory of the user device for either recording or generating a screen display or both.

Figure 16:
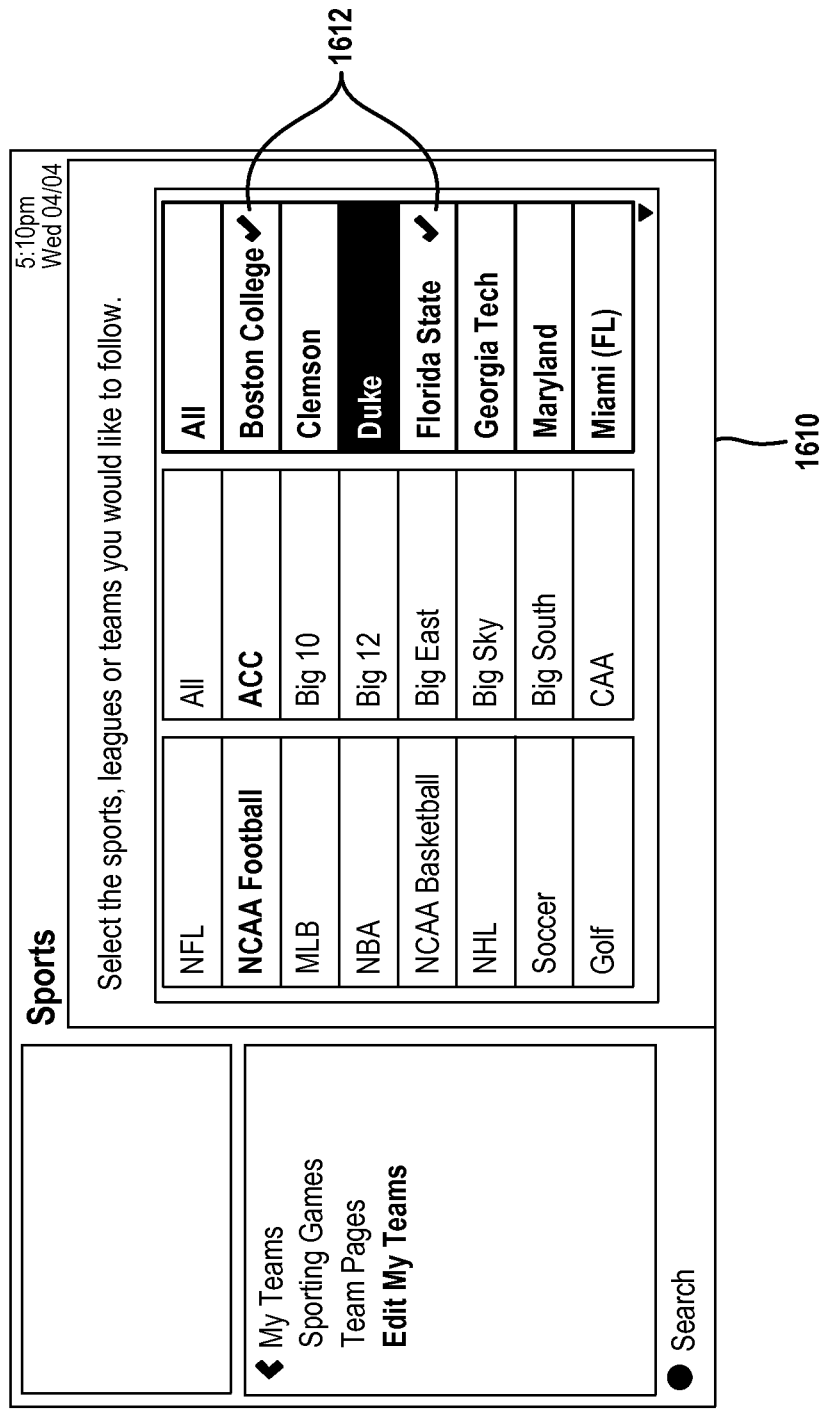
FIG. 16 is a team selector for selecting a team.

Referring now to FIG. 16, if "ACC" is selected, screen display 1610 is illustrated having the selections for the teams within the ACC. In this example, a cursor may be moved and selected. In this example, Boston College and Florida State have checkmarks 1612 which indicate the two colleges whose football programs are to be recorded and/or displayed at the user device. Placing the cursor on the selected item may select or deselect the item.

Figure 17:
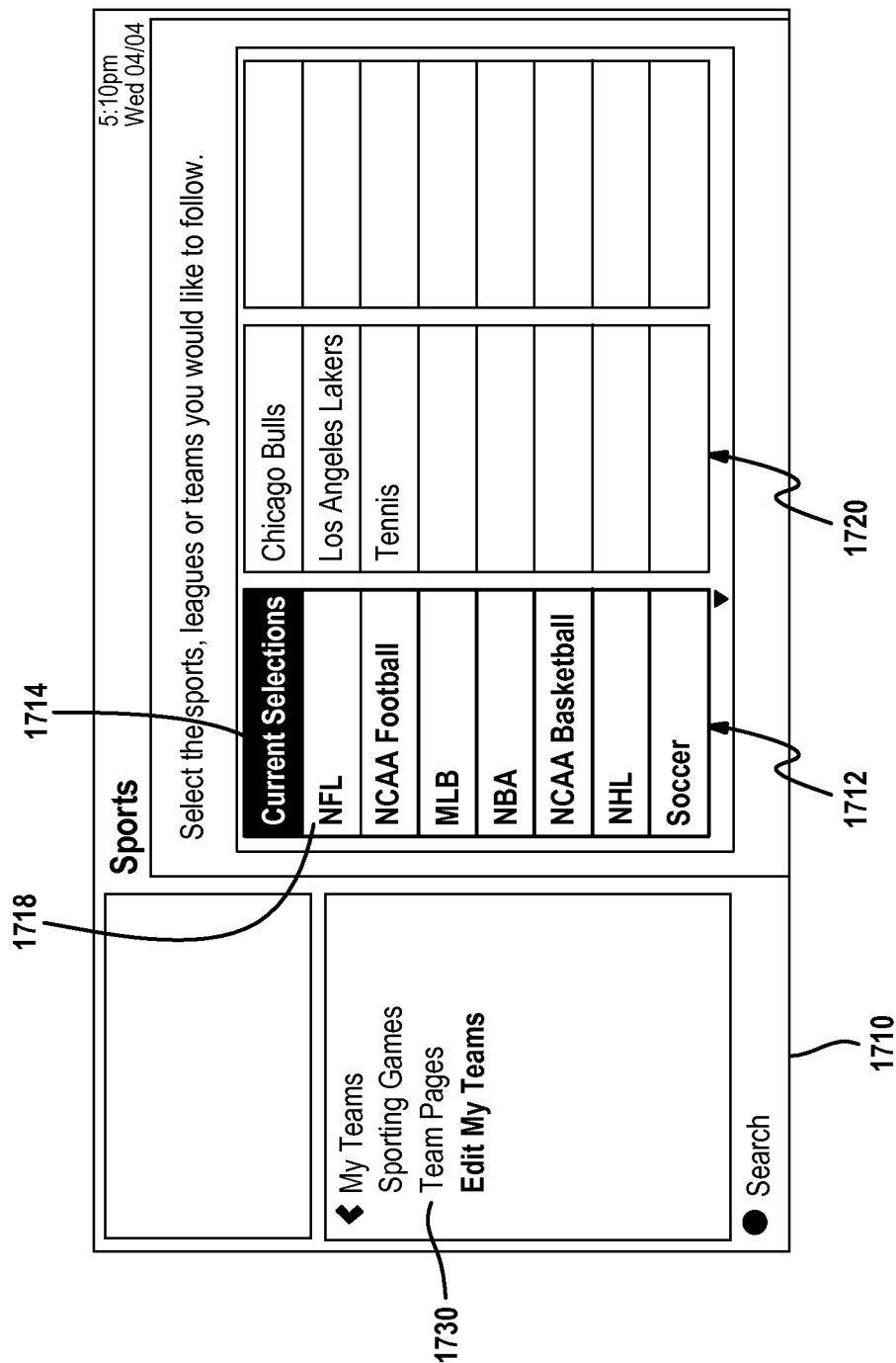
FIG. 17 is a screen display for displaying current "MY TEAMS" selections.

Referring now to FIG. 17, overall current selections are illustrated in screen display 1710. In the first column 1712, all current selections may be illustrated by selecting the box 1714. Current MY TEAM selections by league or sports are illustrated in the area 1718. In the present example, the current selections box is selected. The column 1720 displays the current MY TEAM selections.

Figure 18:
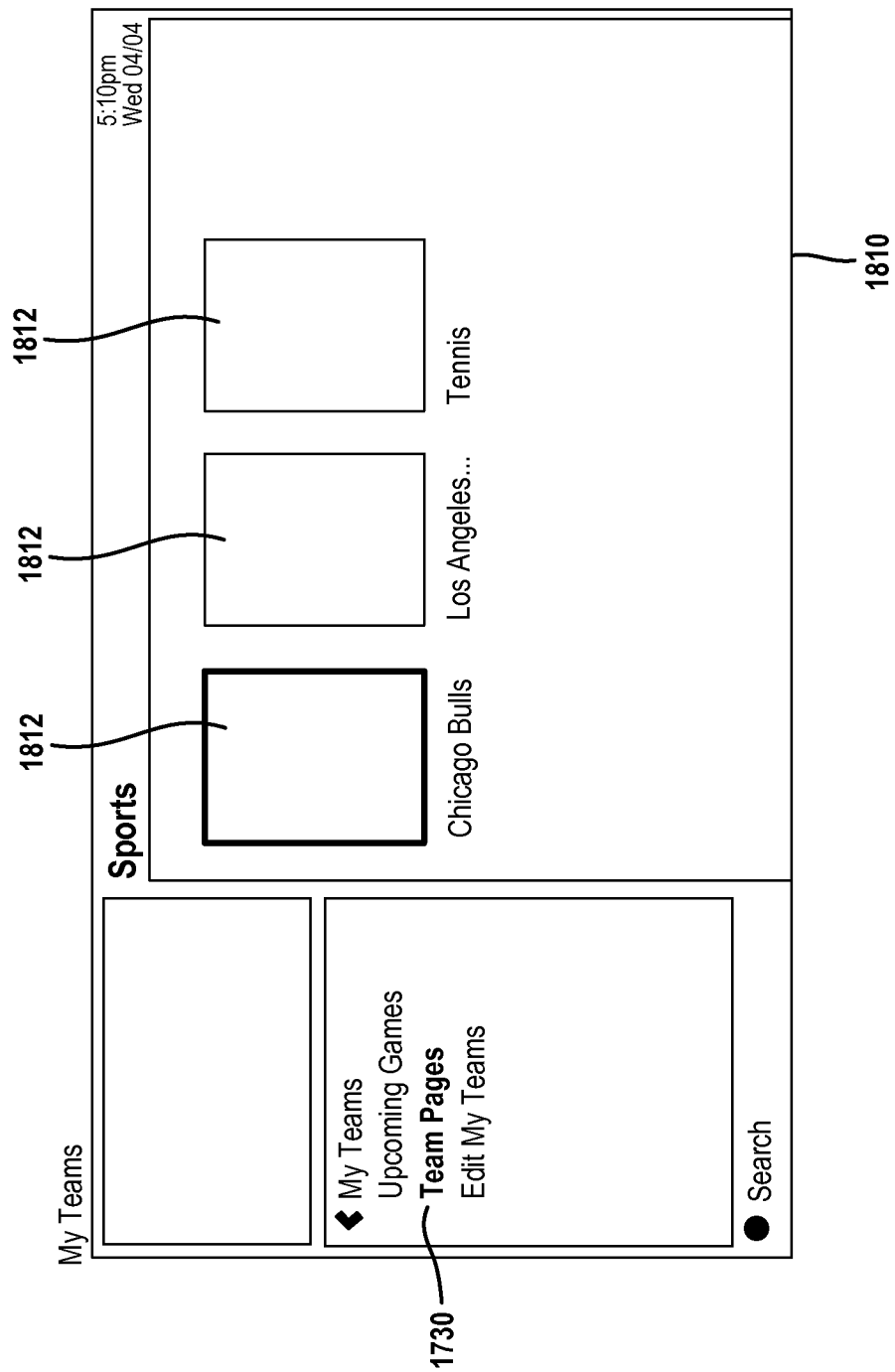
FIG. 18 is a screen display illustrating posters of various screen displays.

Referring now to FIG. 18, the currently selected teams may be displayed in posters 1812 of the screen display 1810. By selecting the team pages selection 1730 in FIG. 17 the screen display 1810 is displayed. The posters 1812 may be a graphical image such as a logo or the type for a particular team or sport. By selecting each team individually, only current listings or recordings with the current team or sport may be generated.

Figure 19:
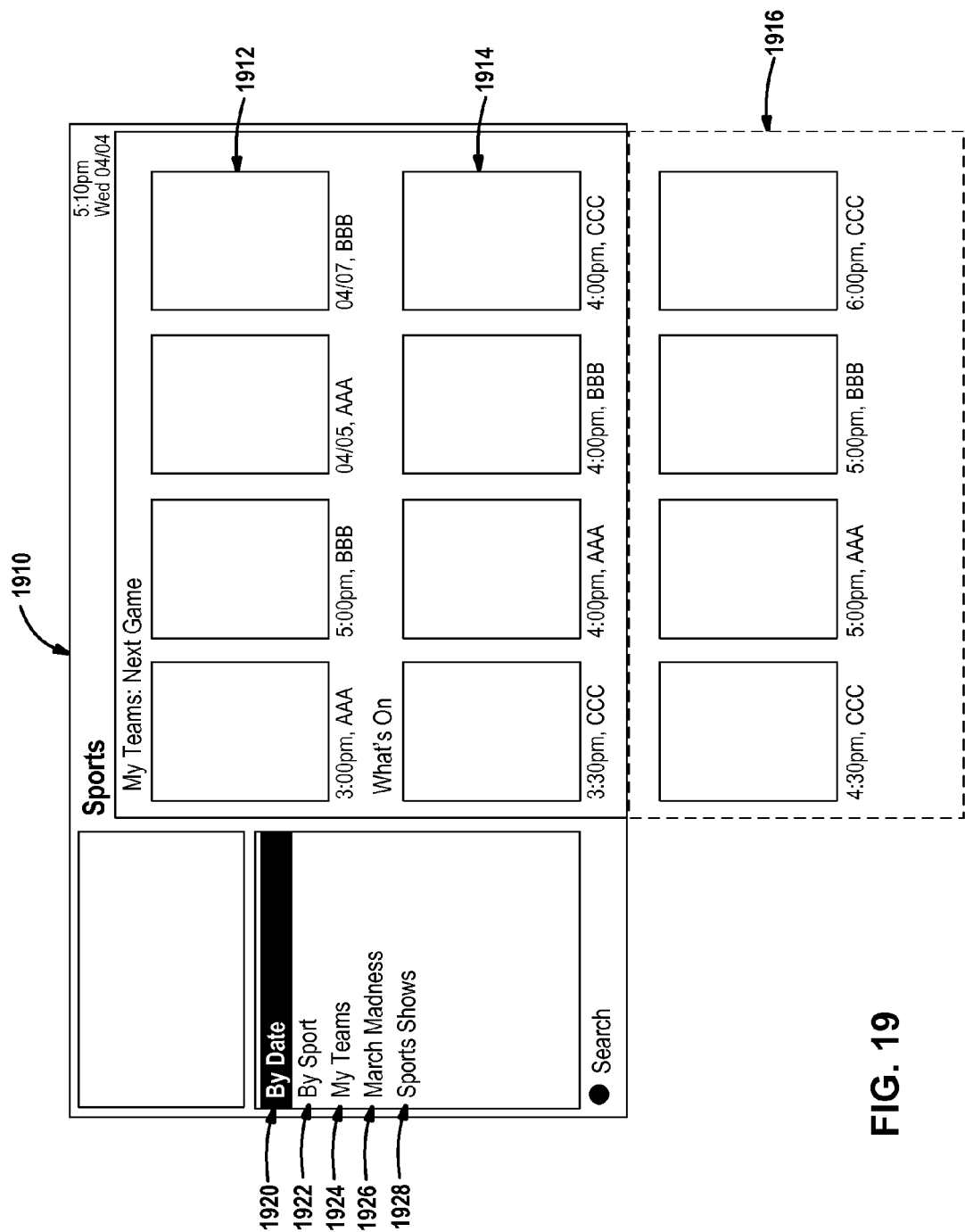
FIG. 19 is a screen display displaying various posters by date.

Referring now to FIG. 19, after a team or teams has been selected, a "MY TEAMS" row 1912 in the screen display 1910 is set forth. The "MY TEAMS" section or row displays current or the next available games or recommendations for the MY TEAM teams selected by the user. These also include selections based upon the hierarchical levels. The MY TEAMS row 1910 displays the next sports program for each of the selected teams and sports. The "What's On" row 1914 displays a recommendations list for all sports programs including currently airing programs for a predetermined period of time such as the next 24 hours for other hierarchical identifiers selected by the user. The "What's On" row may be scrollable as indicated by the dotted box 1916 to display further events in chronological order. These selections are also capable of being displayed in different orders by the selectors 1920, 1922, 1924, 1926 and 1928. Selector 1920 displays the screen display 1910 by date. Selector 1922 displays the screen display by sport. Selector 1924 displays the order by team, selector 1926 displays the order by March Madness and selector 1928 selects the teams by sports shows.

Figure 20:
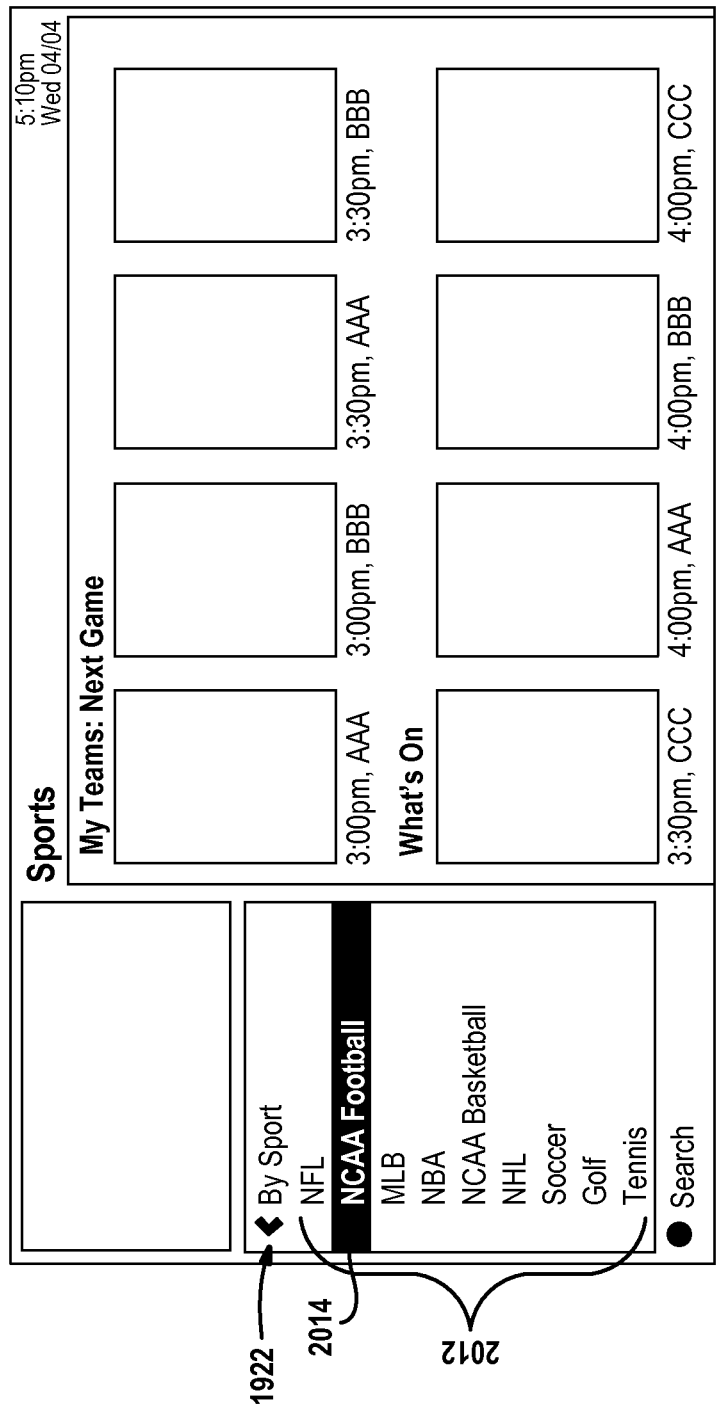
FIG. 20 is a screen display illustrating various programming by organization.

Referring now to FIG. 20, when the selector is selected "by sport," further elements may be used for selecting the particular sport. The "by sport" selector 1922 is broken down into the individual sports represented by the selectors 2012. By selecting one of the selectors 2012 the screen display 2010 displays only content for those particular sports. In this example, the selector 2014 corresponds to NCAA football.

Figure 21:
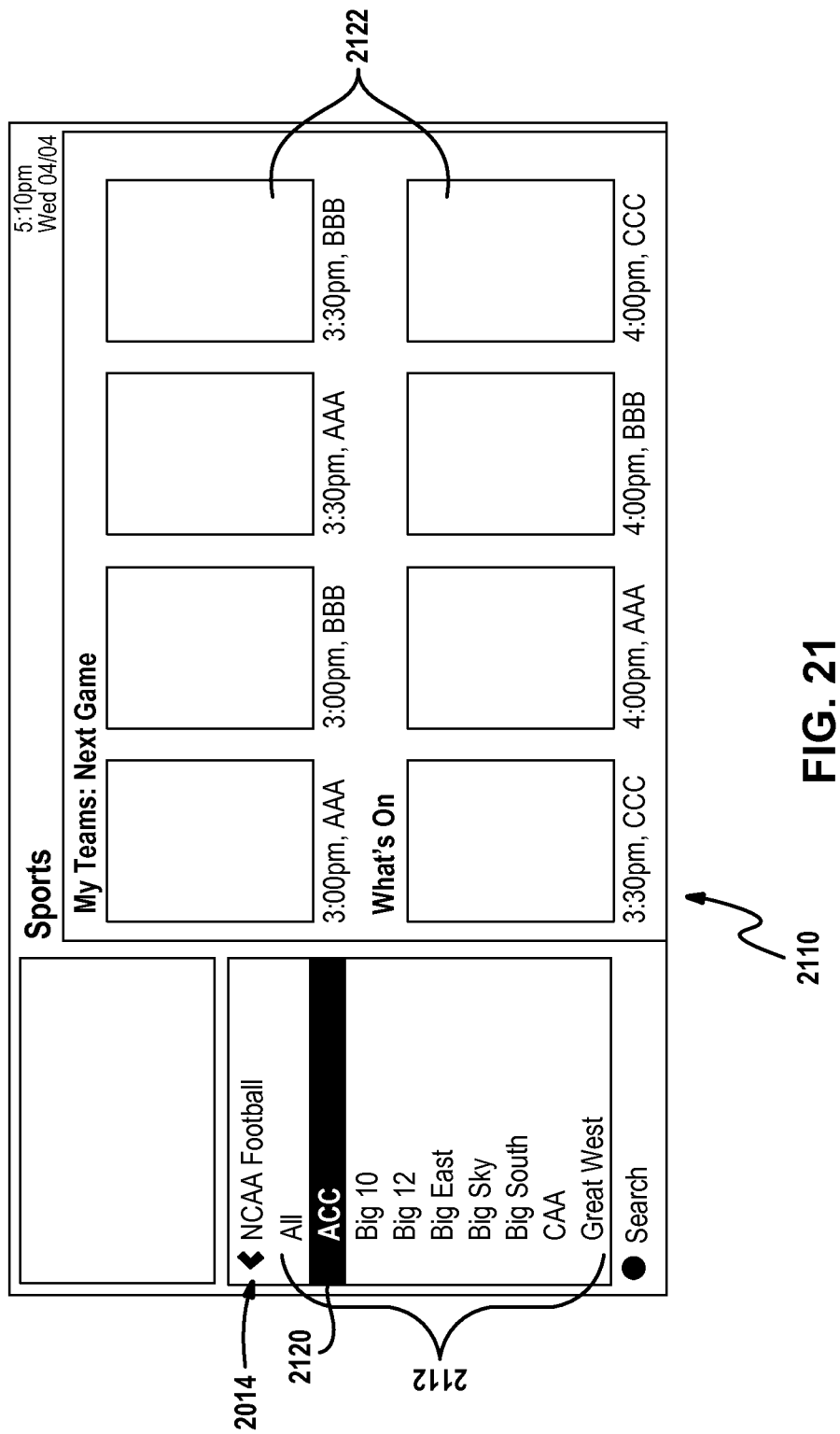
FIG. 21 is a screen display showing various programming by NCAA division.

Referring now to FIG. 21, when the NCAA football selector 2014 is selected, a screen display breaking out each of the conferences within the NCAA is set forth by the indicators 2112 in the screen display 2110. In this example, the ACC selector 2120 is highlighted to allow the "MY TEAMS" section and the "What's On" section to display only an NCAA football posters 2122.

Figure 22:
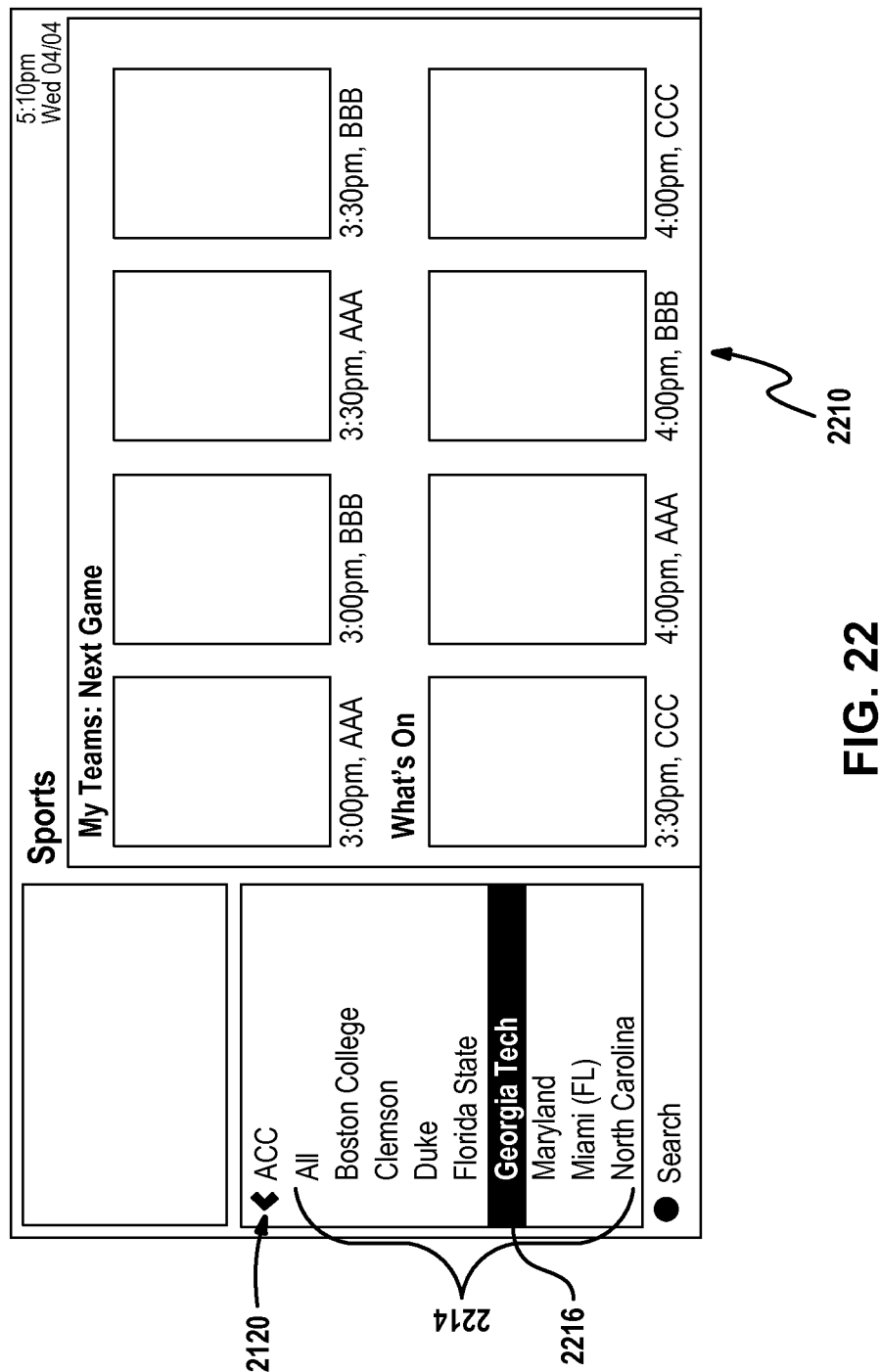
FIG. 22 is a screen display illustrating a specific ACC team of the NCAA.

Referring now to FIG. 22, when the ACC selector 2120 of FIG. 21 is selected, screen display 2210 is controlled to display the various choices or selectors 2214 for selecting the ACC. In this example, a screen selector 2216 has selected Georgia Tech within the ACC. By selecting Georgia Tech, only Georgia Tech content appears in the "MY TEAMS" portion and the "what's on" portion of the screen display 2210.

Figure 23:
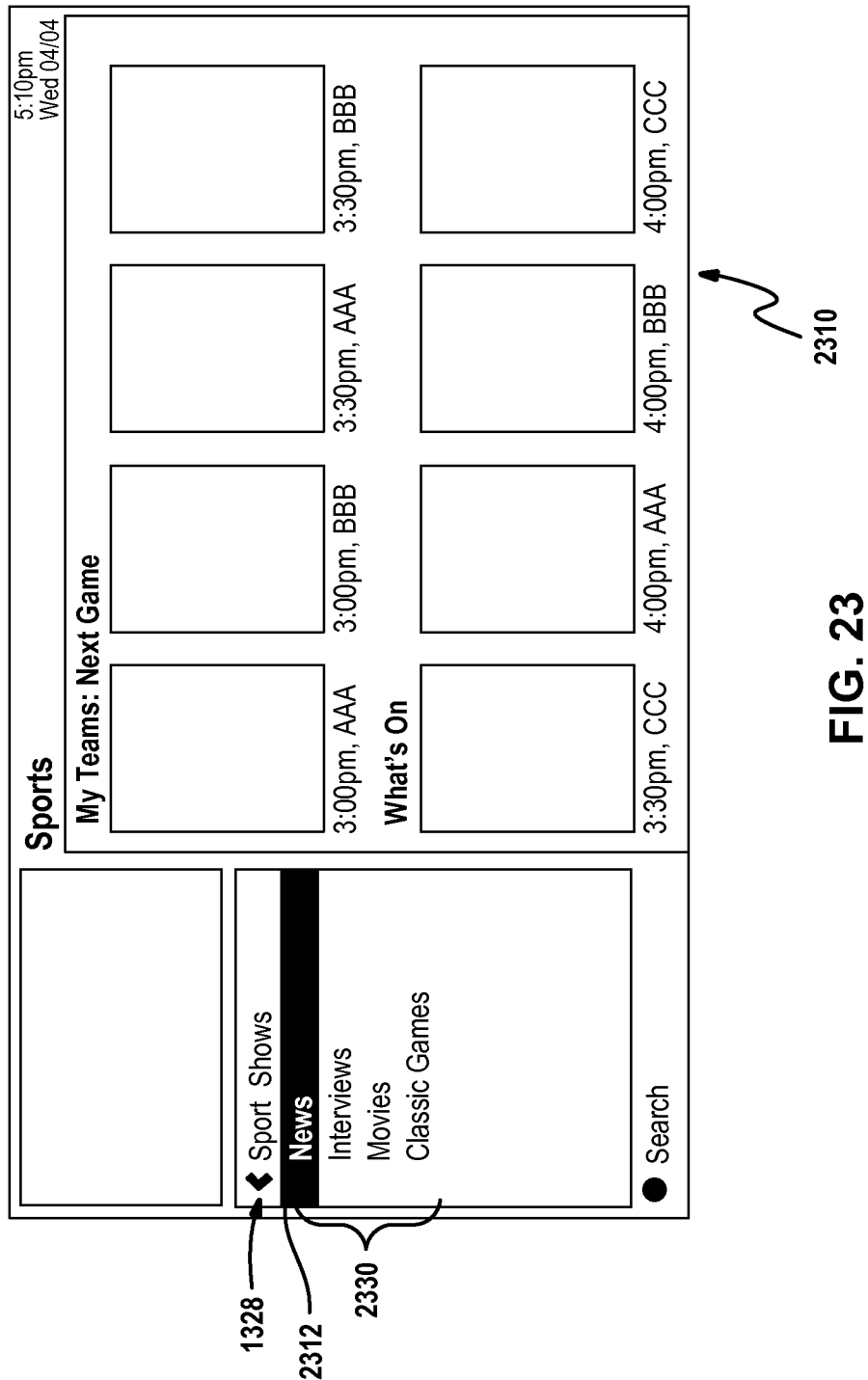
FIG. 23 is a screen display showing news programs under the sports section.

Referring now to FIG. 23, a screen display 2310 is illustrated after selecting the sports show selector 2328 illustrated in FIG. 13. The selectors 1330 illustrate the selections under the sports show category. In this example, news, interview, movies and classic games are all selectors for selecting the items on the screen display 2310. In this example, news selector 2312 displays the content posters corresponding to news programming.

Figure 24:
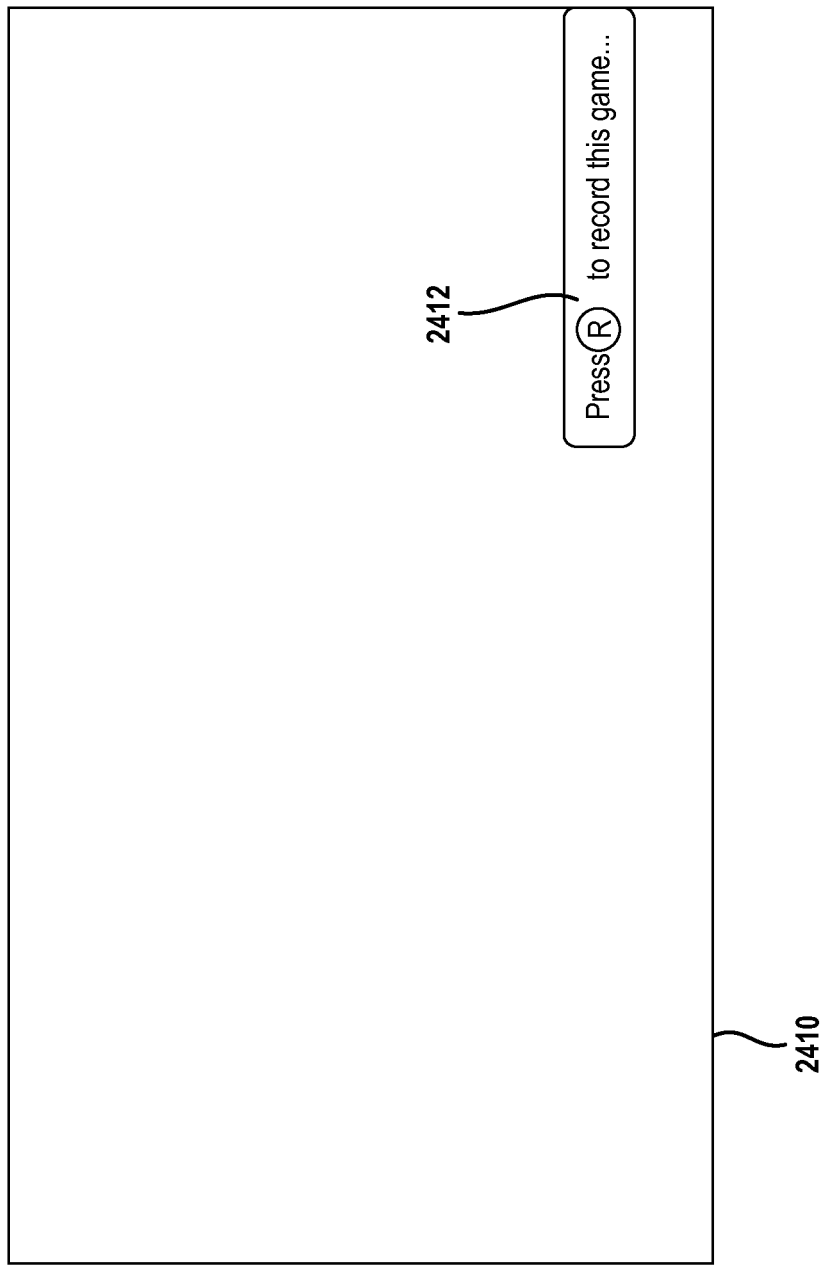
FIG. 24 is a screen display for recording content.

Referring now to FIG. 24, a screen display 2410 for recording a particular event is set forth. Upon the selection of one of the posters illustrated in the Figures above by a remote interface associated with the user device, a recording selector 2412 is set forth for recording the particular event such as a game. Upon selecting the selector 2412, the content may be recorded to the storage device of the set top box.

Figure 25:
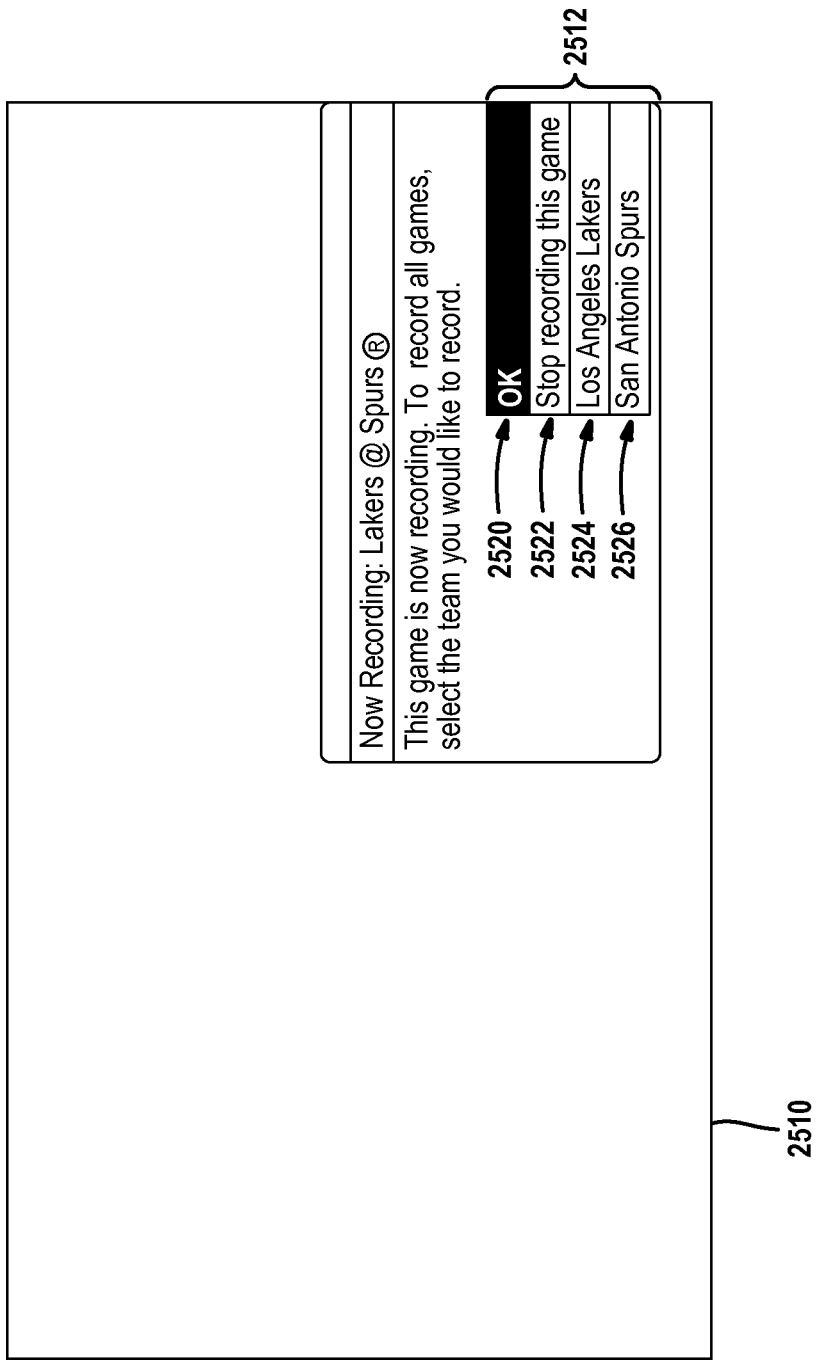
FIG. 25 is a screen display for recording content options.

Referring now to FIG. 25, a screen display 2510 corresponding to further record options 2512 is set forth. After the recording is selected in box 2412 of FIG. 24, other teams and/or games may be selected in the selectors 2520, 2522, 2524 and 2526. In this example, selector 2520 continues recording the content. Selecting the selector 2522 stops recording the content currently recording. By selecting box 2524 or 2526 further content for the current teams may be recorded. In this example, the Los Angeles Lakers and the San Antonio Spurs may have games recorded by selecting selectors 2524 and 2526.

Figure 26:
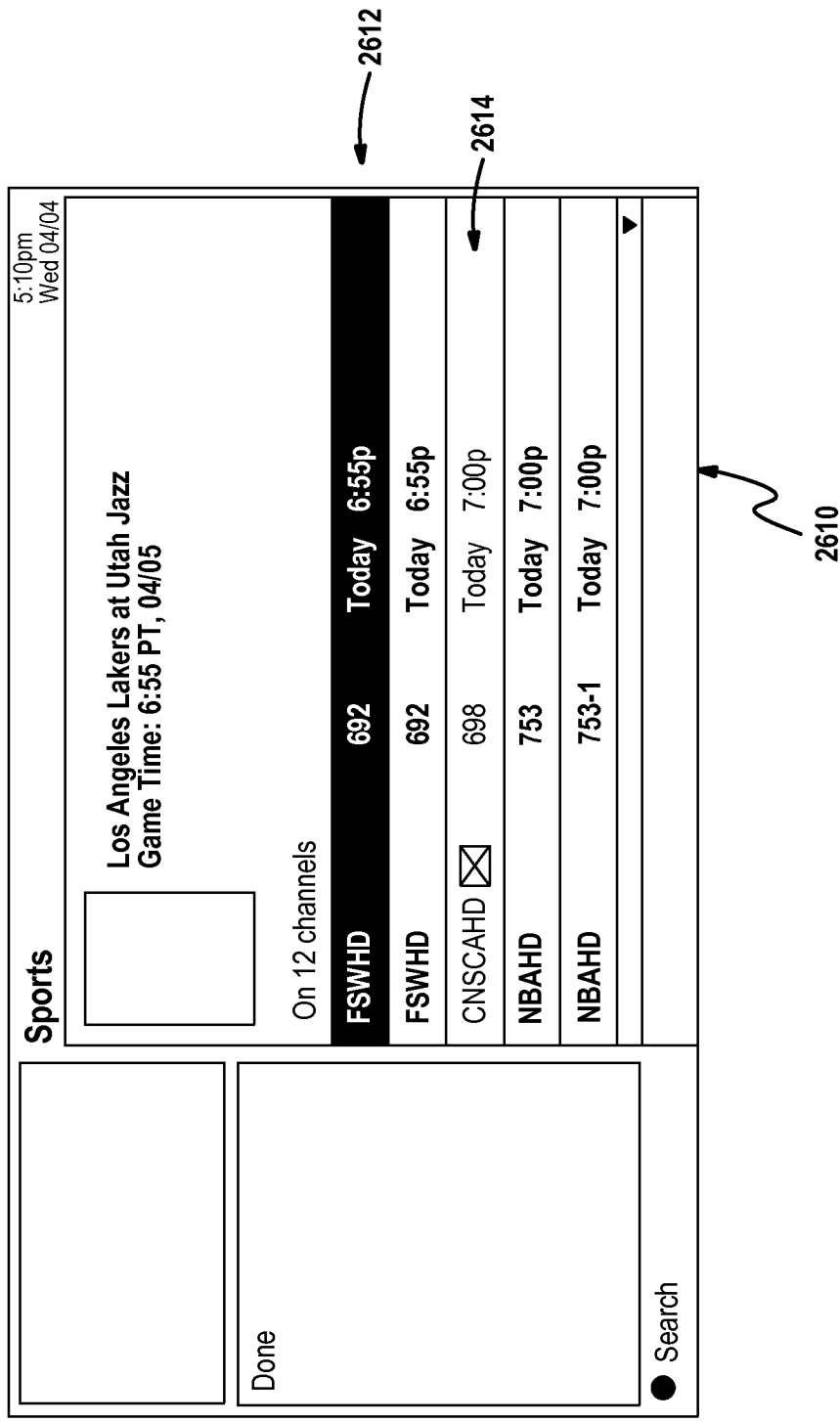
FIG. 26 is a screen display for multiple channels for a particular content.

Referring now to FIG. 26, a screen display 2610 displays channel data 2612 for all channels broadcasting a selected sports program. In this example, the Los Angeles Lakers at the Utah Jazz is broadcasted on three different channels in this example channel 698 in row 2614 is lighter in color and to indicate that the current subscriber is not subscribed to the channel.

Figure 27:
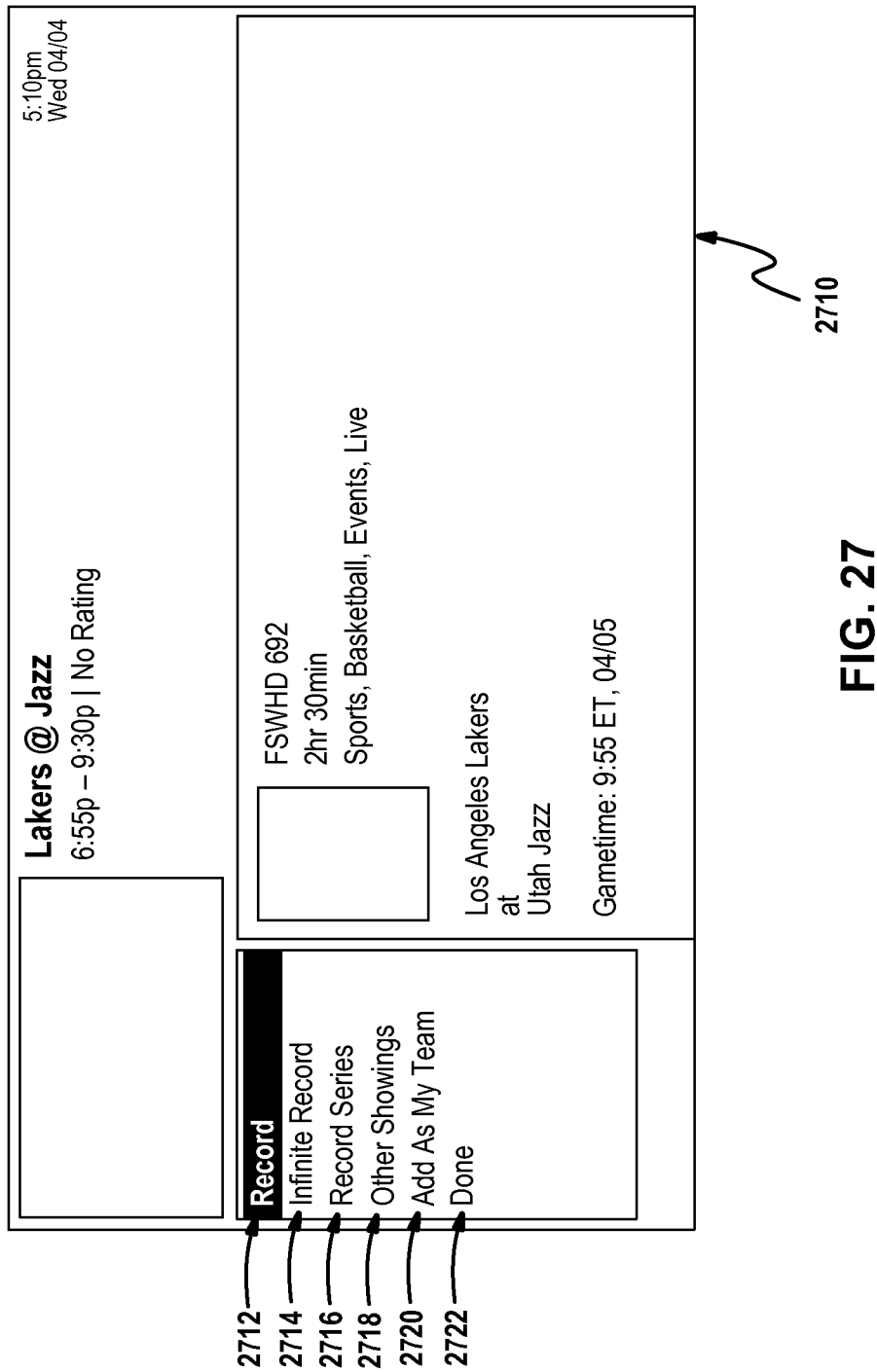
FIG. 27 is a screen display for recording a particular selection.

Referring now to FIG. 27, a screen display 2710 is displayed after selecting the first row of channels of FIG. 26. Various descriptors (selectors) 2712, 2714, 2716, 2718, 2720 and 2722 are set forth. Selector 2712 is selected to record the current program. Selector 2714 is used for performing an "infinite" record. As will be described below, infinite record corresponds to recording all live games of a particular team. Recording a series may also be performed by selecting the selector 2716. Other showings of the same recording may be displayed by selecting selector 2718. Adding one or more of the teams may be performed by selecting the selector 2720. When this screen is done and the user wishes to return to the previous screen, selecting selector 2722 corresponding to "done" is performed.

Figure 28:
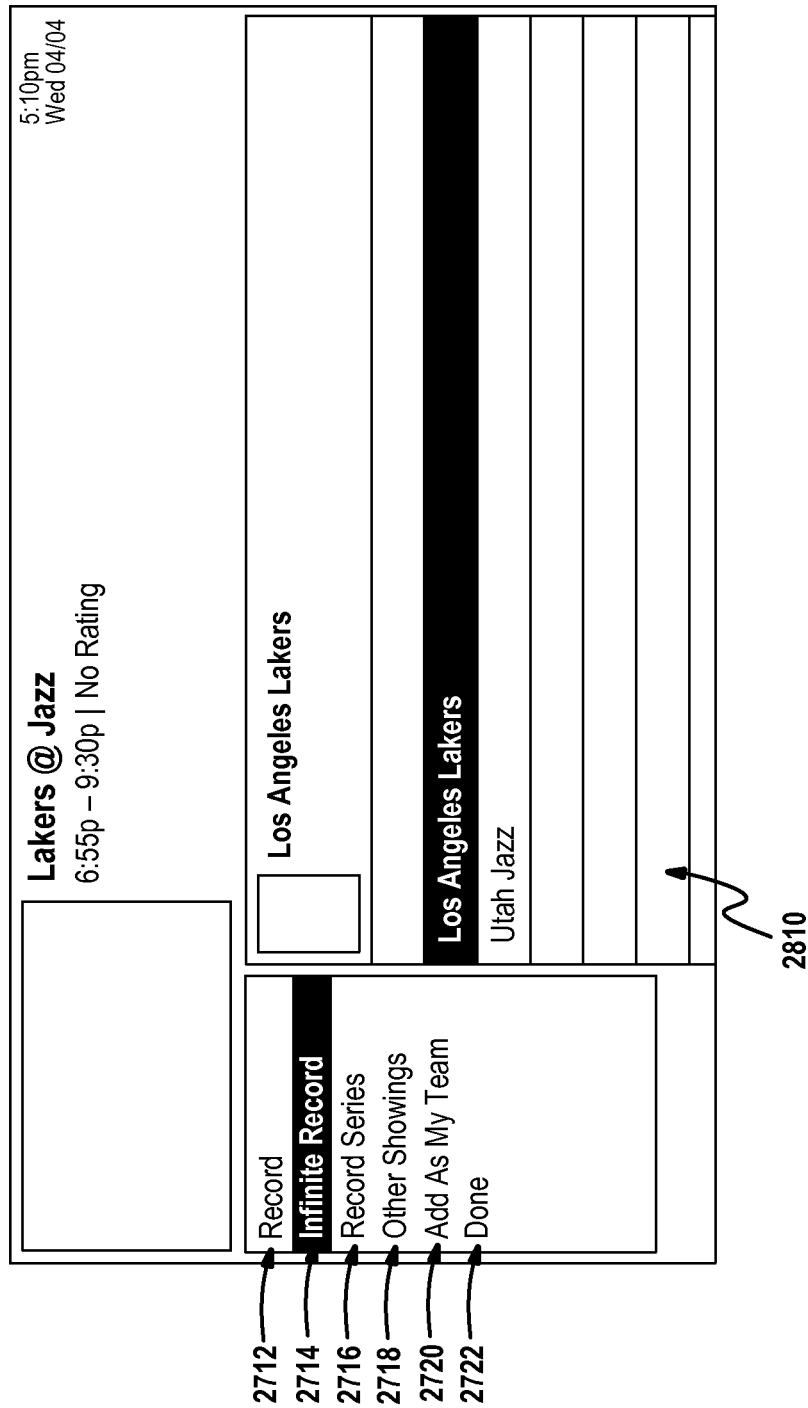
FIG. 28 is a screen display of recording options for the selected programming.

Referring now to FIG. 28, screen display 2810 is displayed when infinite or when the infinite recording selector 2714 is selected. In this example, both the Los Angeles Lakers and Utah Jazz were illustrated in the previous screens and thus both teams may be generated on the screen display 2810.

Figure 29A:
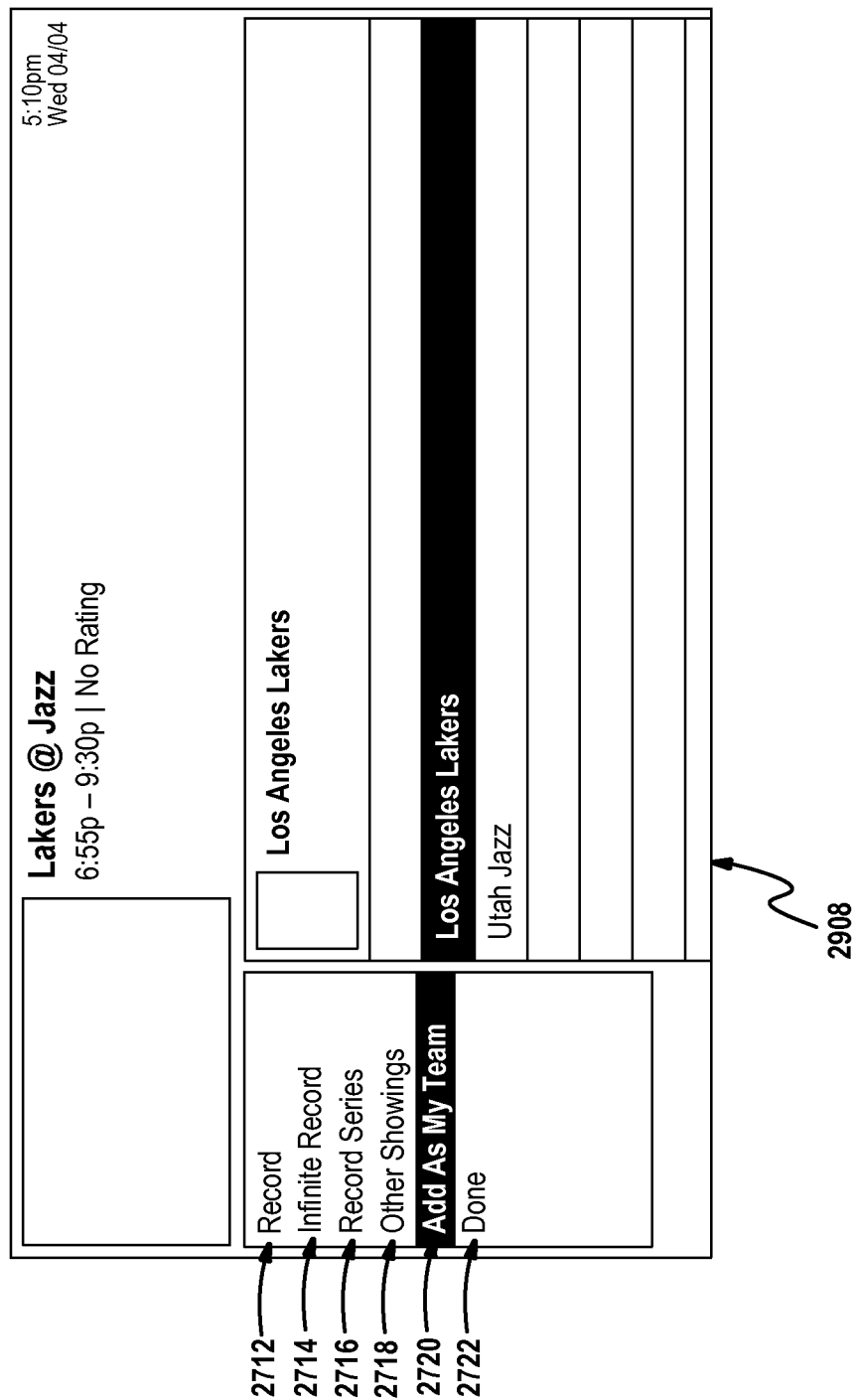
FIG. 29A is a screen display for adding teams of FIGS. 27 and 28 to a "MY TEAMS."

Referring now to FIG. 29A, the user may select the "Add As MY TEAM" selector 2720 to add the Los Angeles Lakers which are selected in the screen display 2910.

Figure 29B:
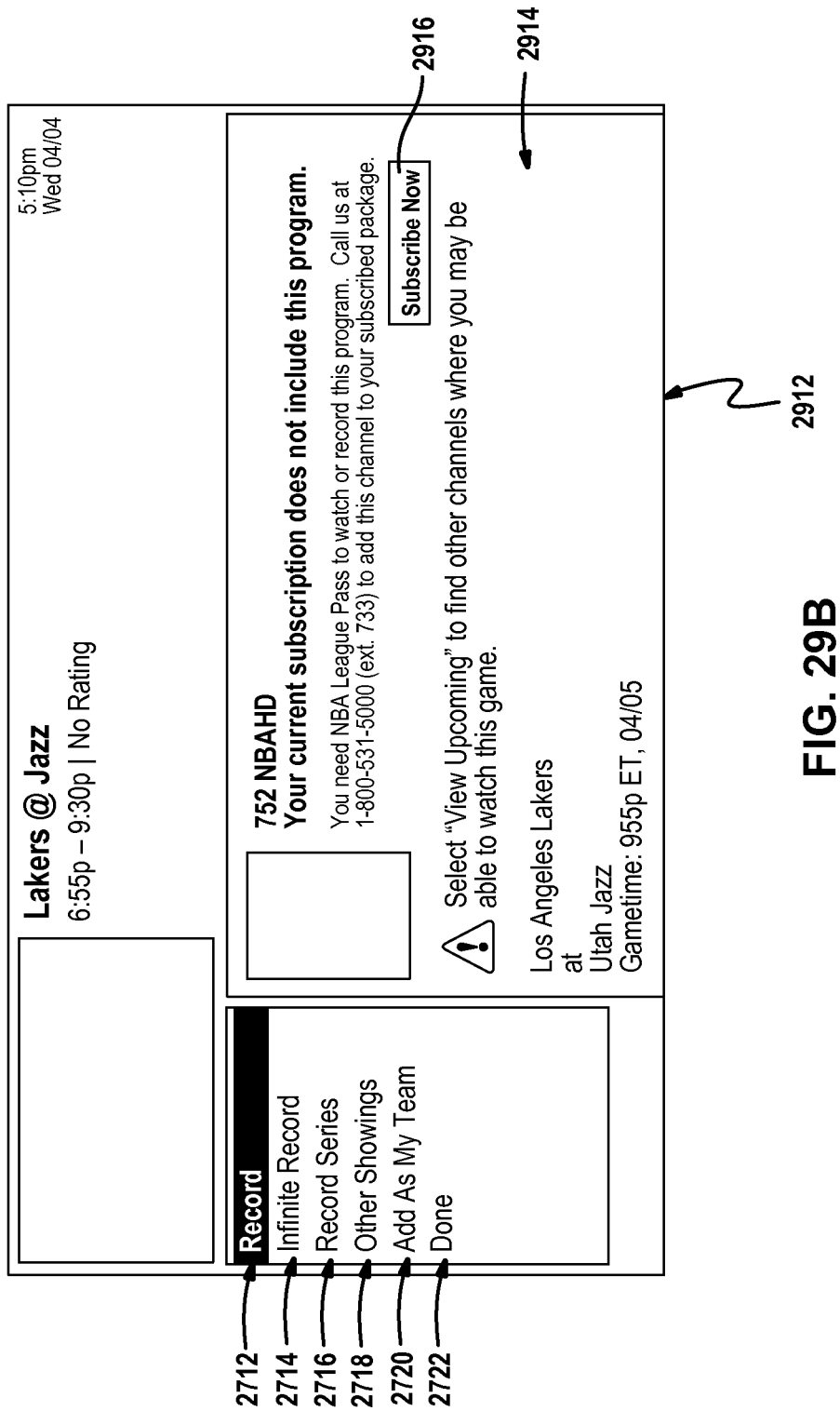
FIG. 29B is a screen display for non-subscription warnings.

Referring now to FIG. 29B, screen display 2912 is displayed to indicate to the user that the current channel requires a subscription. Thus, a warning 2914 may be generated. A button 2916 may be generated to allow the user to select the button 2916 and subscribe to the content.

Figure 29C:
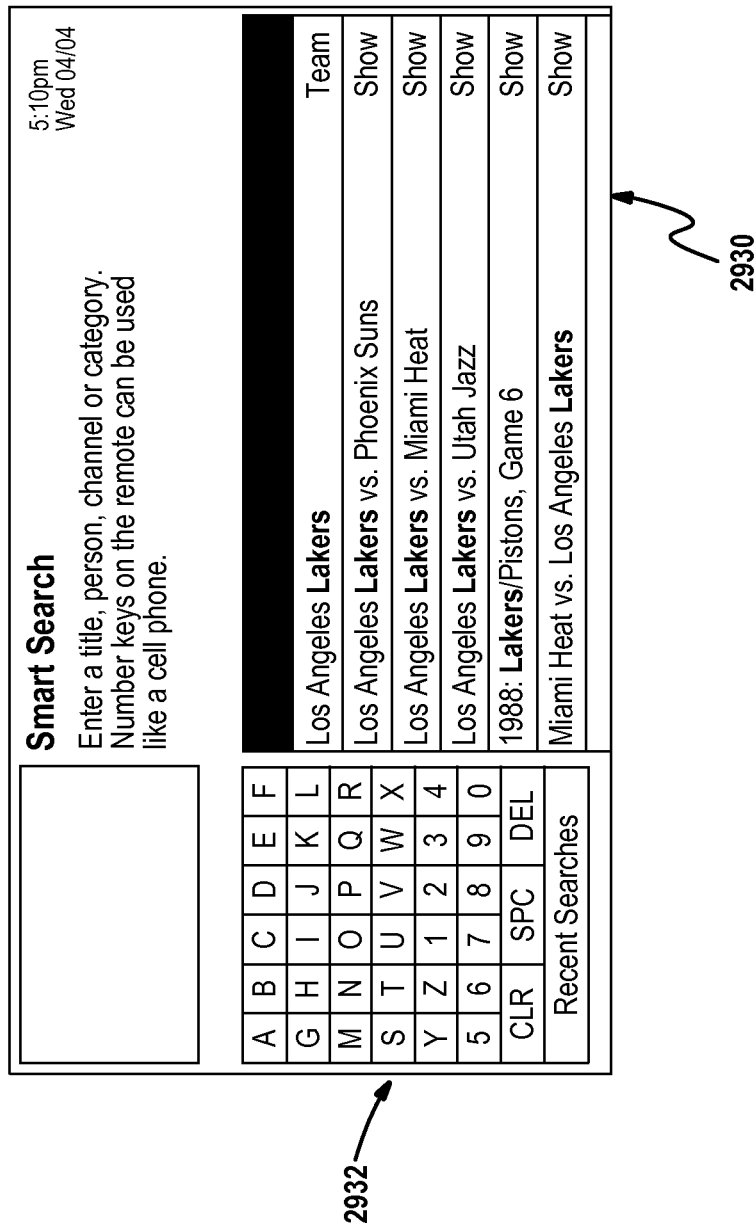
FIG. 29C is a screen display for smart searching.

Referring now to FIG. 29C, screen display 2910 illustrates a smart search function. A smart search function generates suggestions upon typing various words with the keyboard 2932. In this example, the word "Lakers" has been typed by the user and a plurality of Lakers suggestions appears below the smart search selector. "Lakers" is chosen corresponding to the Los Angeles Lakers since the Lakers is categorized higher relative to the search results based upon the Los Angeles Lakers being a selected team. Thus, the MY TEAM teams selected by the user increase the likelihood in the smart search results.

Figure 30:
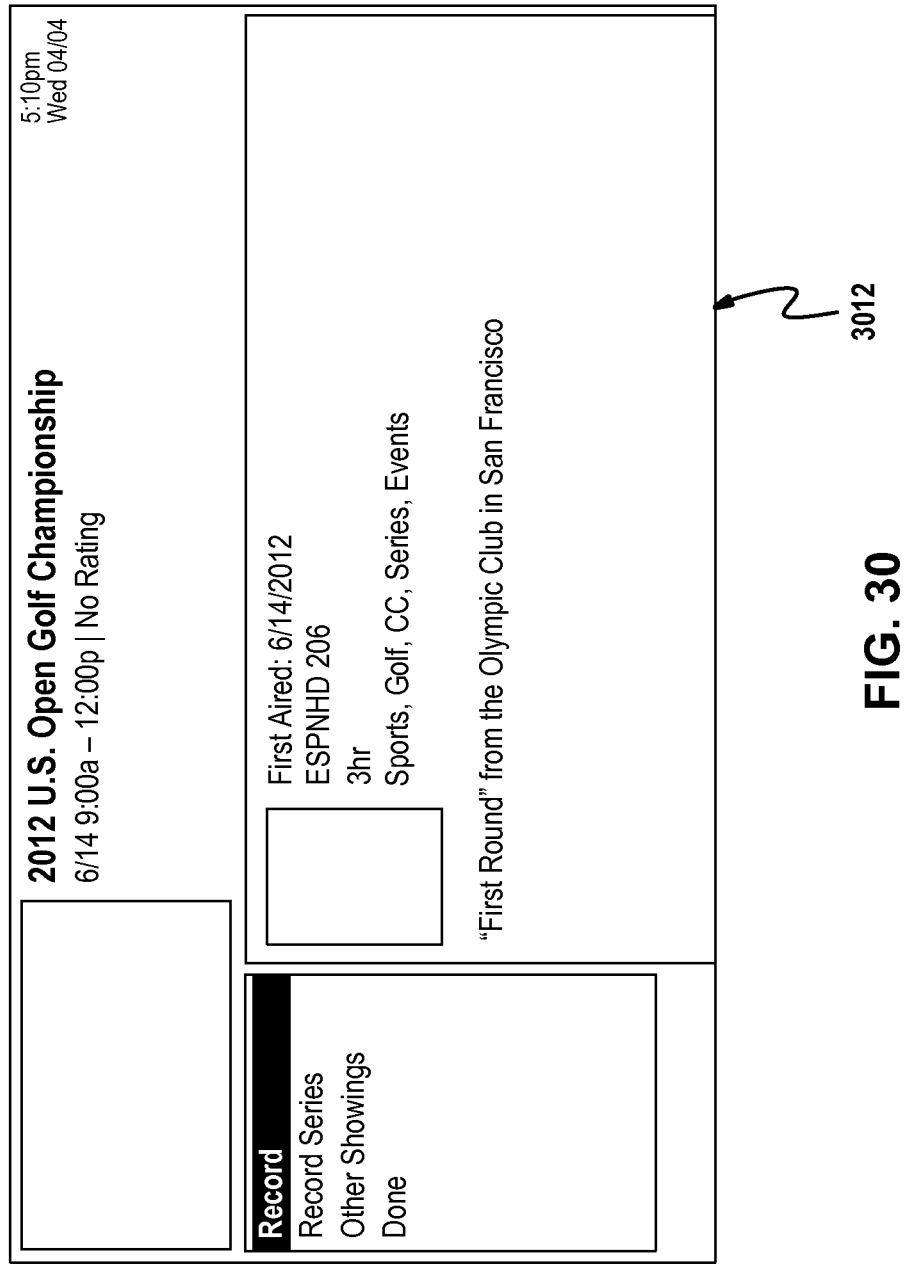
FIG. 30 is a screen display for displaying a golf championship.
Figure 31:
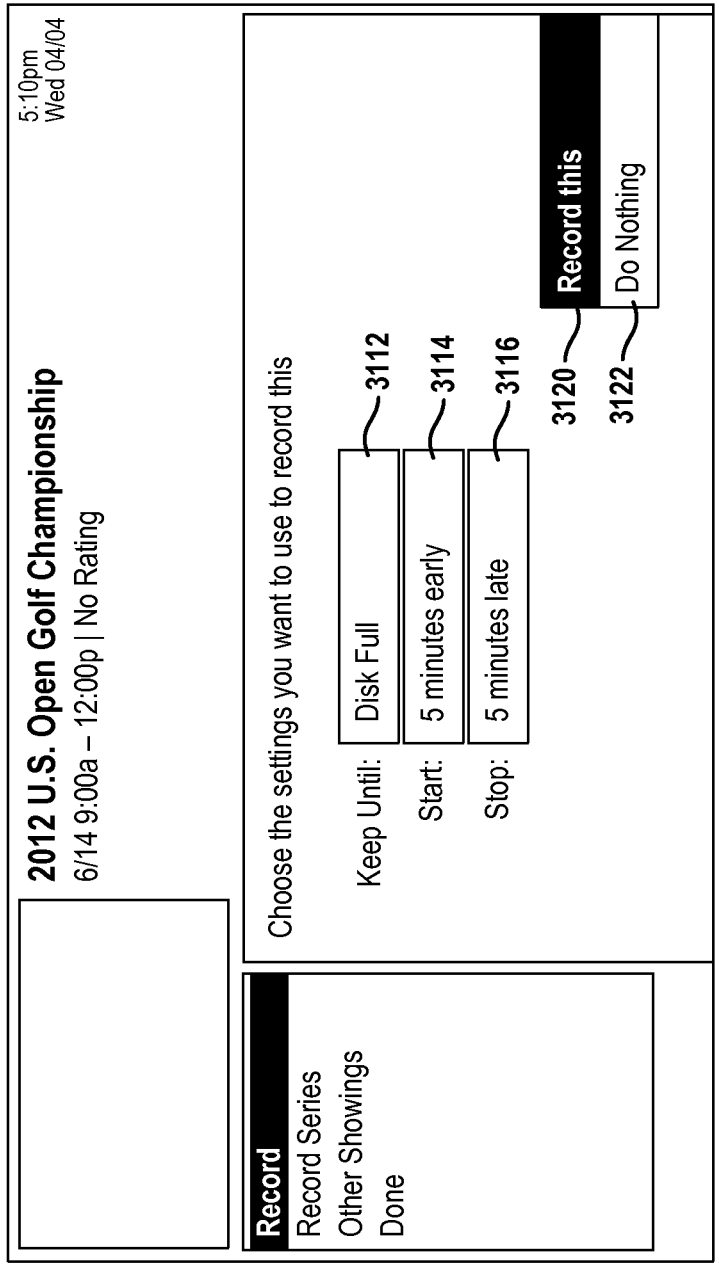
FIG. 31 is a screen display illustrating recording options for a golf championship.

Referring now to FIG. 30, when a non-live event, such as the "U.S. Open Golf Championship of 2012" is selected for recording, in screen display 3012, FIG. 31 will present various recording options including recording until the disc is full as indicated by indicator 3112 starting the recording 5 minutes early as indicated by selector 3114 and stopping the recording 5 minutes late as indicated by selector 3116. A confirmation selector 3120 confirms recording while 3122 cancels the recording.

Figure 32:
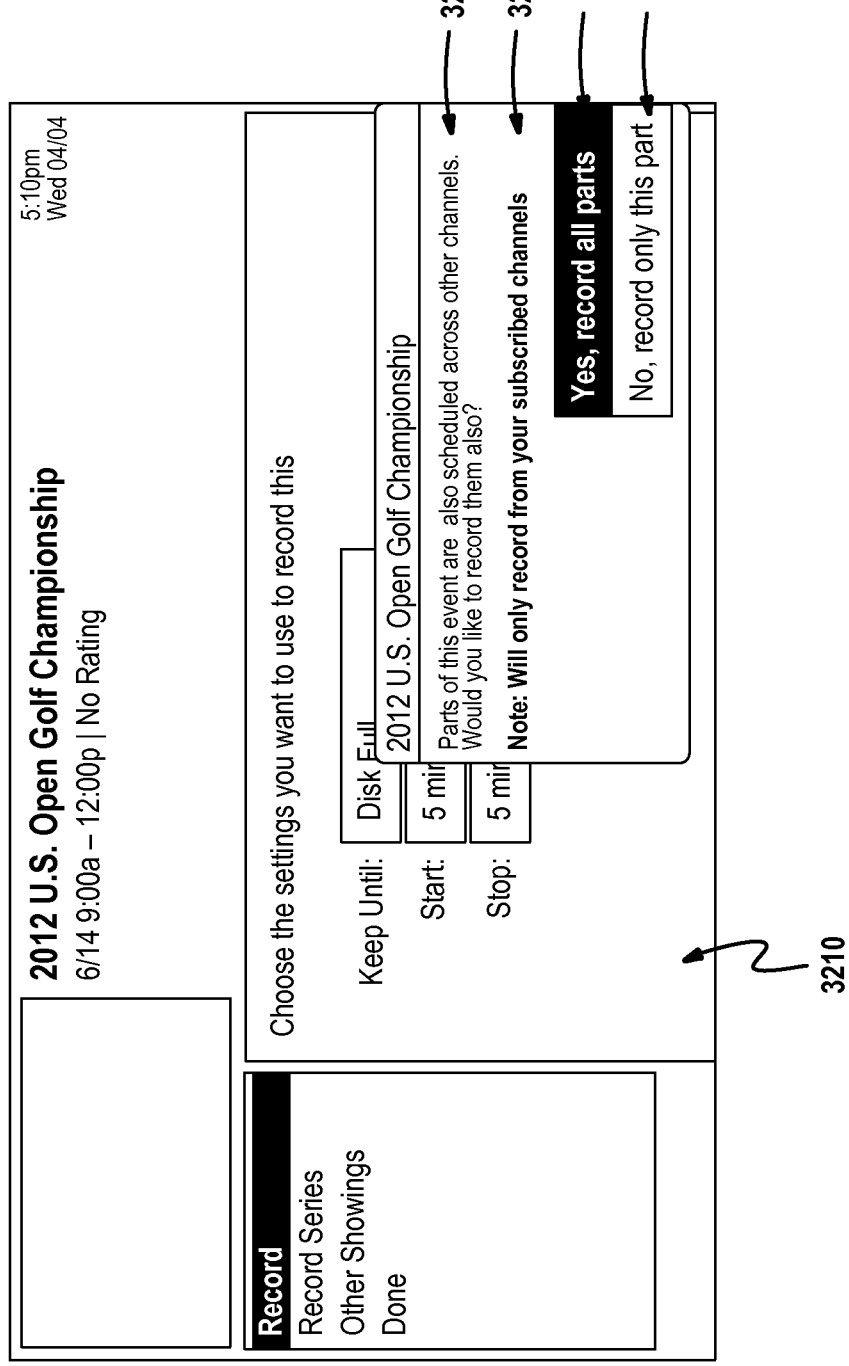
FIG. 32 is a screen display for recording options on multiple channels of a golf championship.

Referring now to FIG. 32, the set top box has determined that the U.S. Golf Championship has been recorded on other channels. That is, other portions of the U.S. Open may be played on other channels. In the case of the U.S. Open, other channels may broadcast various days of the Championship. The last day of the U.S. Golf Championship may be broadcasted on the most popular channel. The screen display 3210 may provide a warning 3214 that the U.S. Golf Championship is displayed on other channels. A notice 3216 may be displayed to indicate only channels subscribed to may be recorded. A query 3218 determines whether the user wishes to record the entire U.S. Open or only the current part of the U.S. Open in query boxes 3218 and 3220 respectively.

Figure 33:
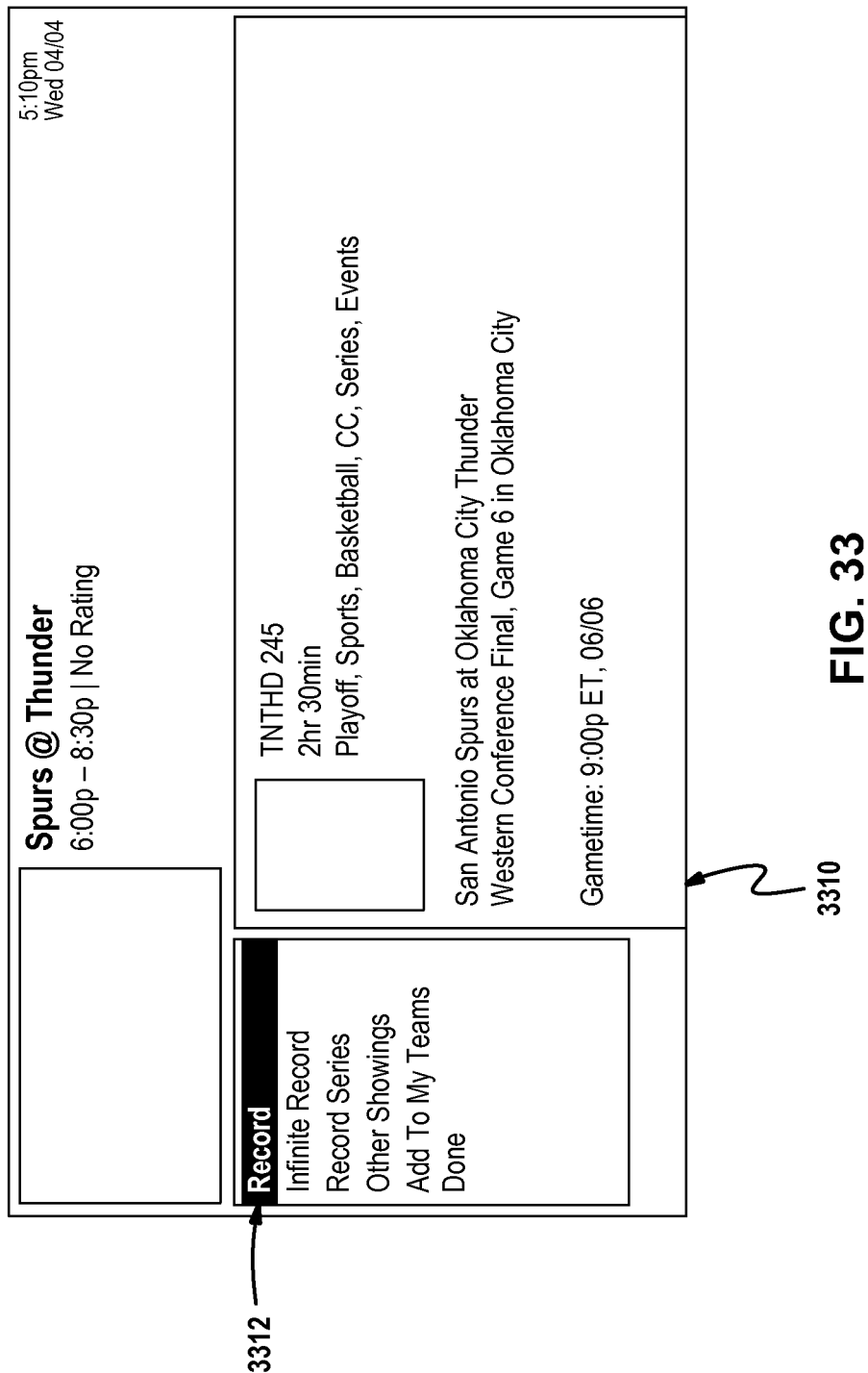
FIG. 33 is a screen display for a playoff series.

Referring now to FIG. 33, a screen display 3310 illustrating a playoff game between the Spurs and the Thunder is set forth. When a record selector 3312 is selected, FIG. 34 is displayed.

Figure 34:
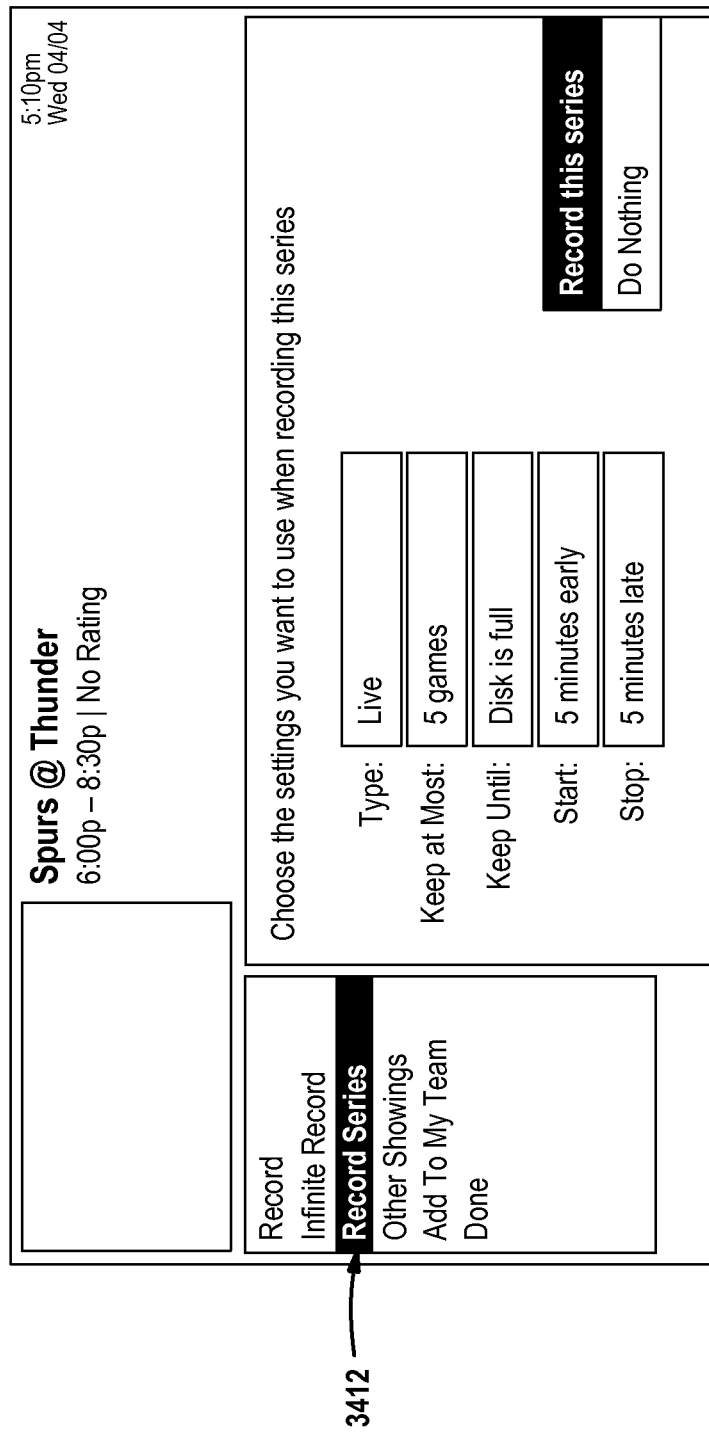
FIG. 34 is a screen display illustrating recording options for a playoff series.

In FIG. 34, the playoff series may be entirely recorded by selecting "record series" indicated by 3412. The screen display 3410 also generates various selectors for options during recording including live recording, record at most five games, record until the disc is full or keep until the disc is full, recording five minutes early or recording five minutes late.

Figure 35:
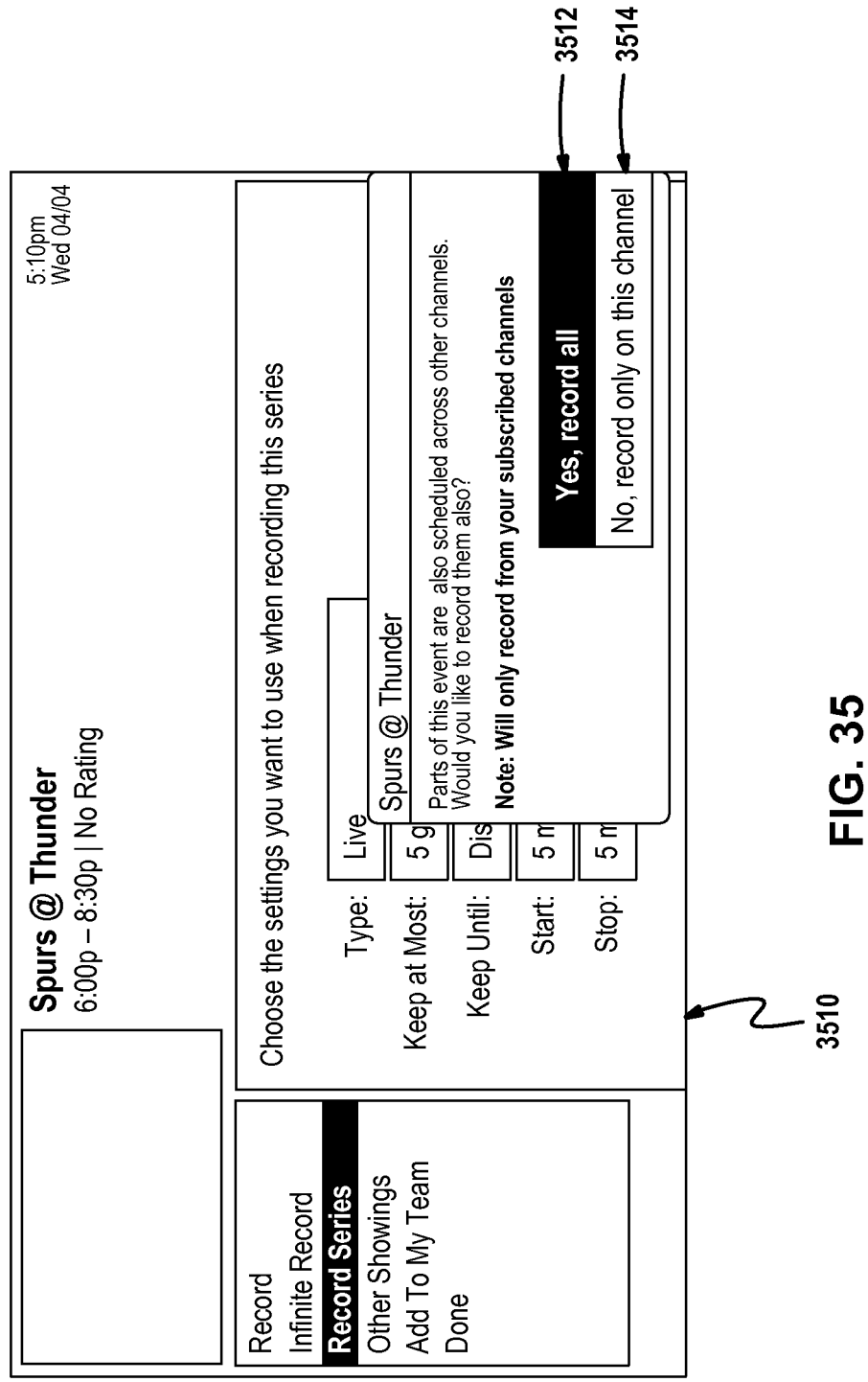
FIG. 35 is a screen display for recording all or only a portion of a playoff series.

Referring now to FIG. 35, screen display 3510 illustrates recording options for recording all or recording only this channel when other channels have the series thereon. The selectors 3512 and 3514 correspond to recording all content on all channels or only content on the present channel respectively.

Figure 36:
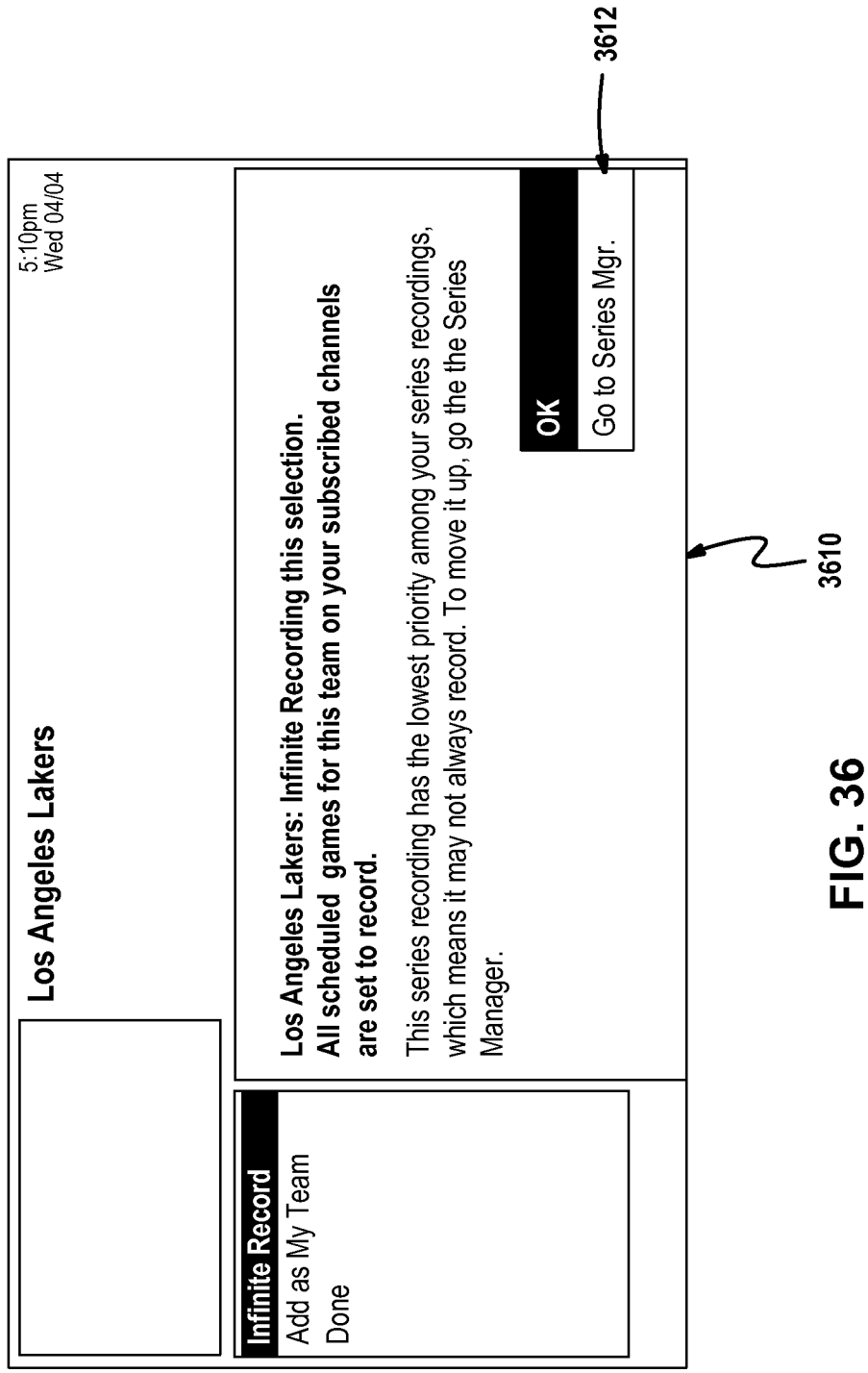
FIG. 36 is a screen display for invoking a series manager such as that illustrated in FIG. 41 below.

Referring now to FIG. 36, an infinite record may also be scheduled screen display 3610 indicates to the user that the Los Angeles Lakers are a low priority. However, upon going to a series manager by selecting selector 3612, the priority may be changed.

Figure 37:
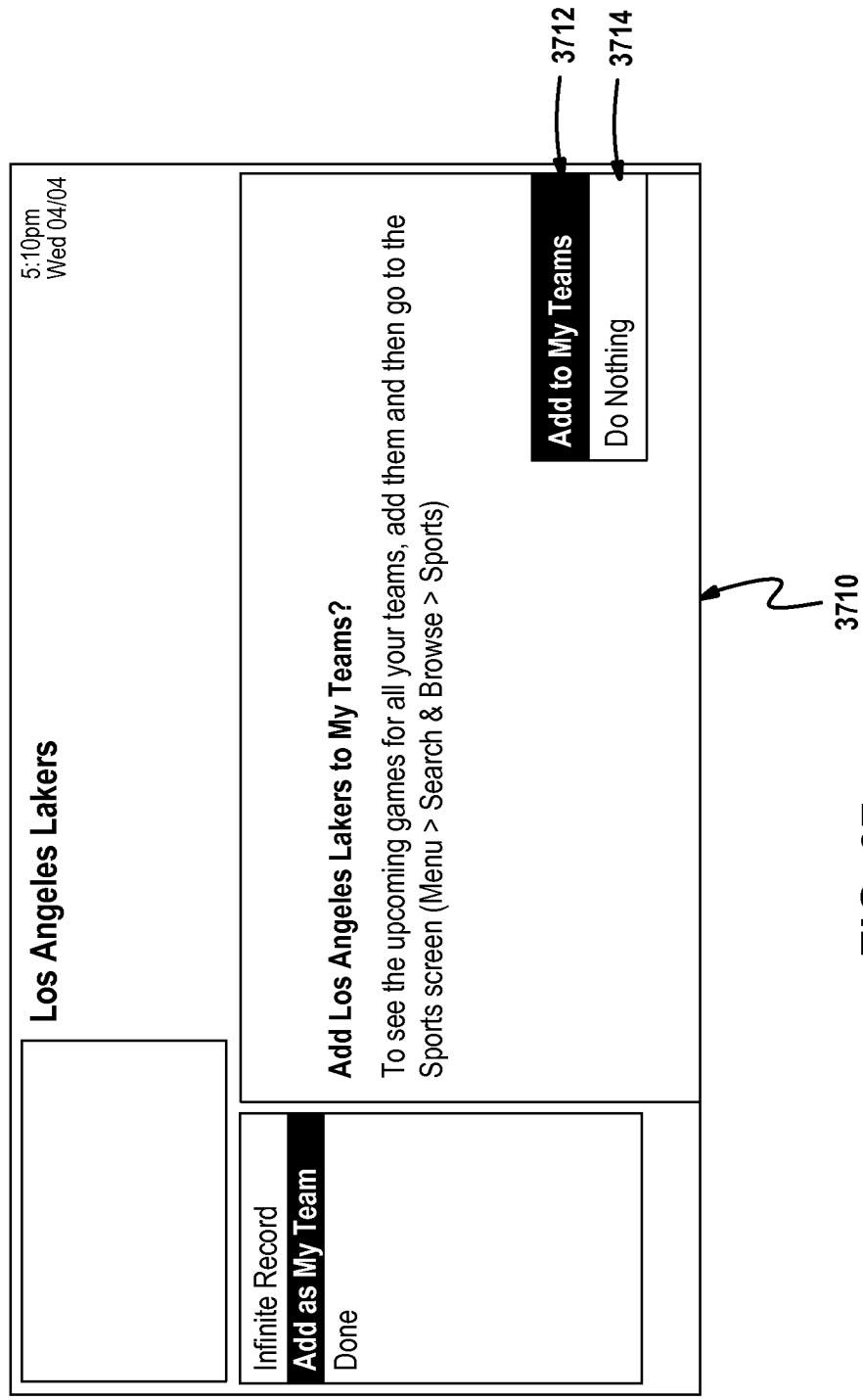
FIG. 37 is a screen display for adding a selected team in FIG. 36 to "MY TEAMS."

Referring now to FIG. 37, the Los Angeles Lakers may be added to the "MY TEAMS" list after selecting a content for recording when the content being recorded includes the Los Angeles Lakers and the Los Angeles Lakers have not been already selected as one of the teams in the "MY TEAMS" selection. The screen display 3710 may include adding the Los Angeles Lakers to "MY TEAMS" by selector 3712 or doing nothing in 3714.

Figure 38:
FIG. 38 is a screen display for editing teams in the MY TEAMS memory.

Referring now to FIG. 38, a partial screen display 3810 is used for editing the teams in the "MY TEAMS" section. By selecting the "edit MY TEAMS" selector 3812, teams can be selected or deselected from column 3816.

Referring now to FIG. 39, a screen display 3910 for watching upcoming sporting events is displayed by selecting "upcoming" selector 3912. Upcoming selector 3912 may display games currently airing or beginning within the next predetermined period of time, such as in the next five minutes when the watch selector 3914 is selected.

Referring now to FIG. 40, a screen display 4010 generates a screen display corresponding to the channels for watching the Lakers and Utah Jazz indicated from the previous channel. Channels 4012 may be selected by moving a cursor about the screen.

Figure 41:
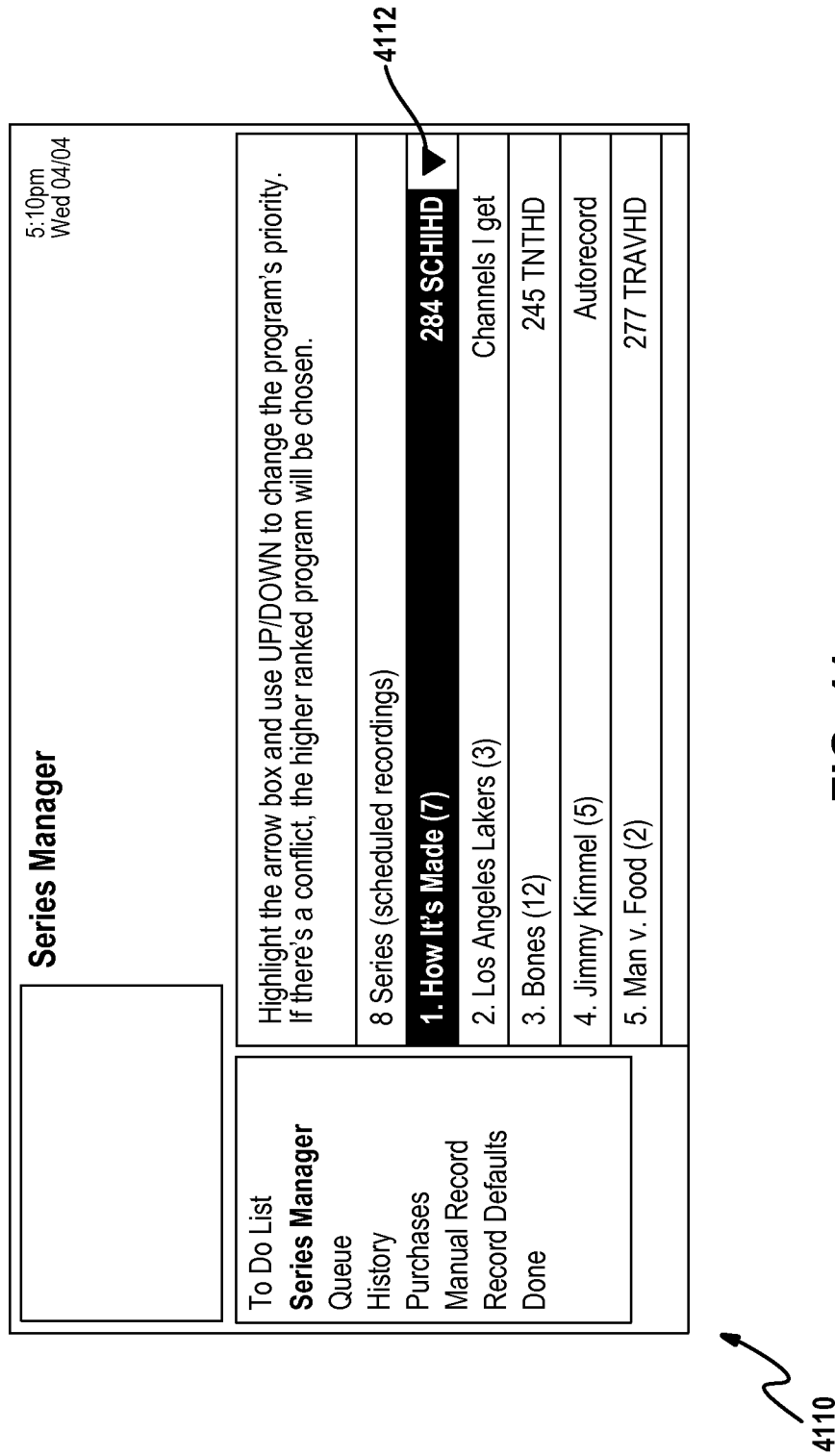
FIG. 41 is a screen display of a series manager.

Referring now to FIG. 41, a series manager screen display 4110 generates a list of the series to be recorded. In this example, an arrow 4112 may be used to move up or down a particular series to increase the priority level.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
at a content processing system, storing a first team identifier associated with a first content and a first hierarchical identifier associated with the first content;
communicating, from the content processing system, the first team identifier and the first hierarchical identifier with first content metadata to a user device;
receiving, at the user device, the first team identifier, the first hierarchical identifier, the first content metadata, team identifiers to form received team identifiers and hierarchical identifiers to form a plurality of received hierarchical identifiers, at least one of the plurality of received hierarchical identifiers comprising a plurality of levels comprising a primary level corresponding to a sport and a secondary level corresponding to a league or organization of the sport and a tertiary level corresponding to a division conference or tournament of the organization or league of the secondary level;
generating a first screen display on a display associated with the user device comprising the received team identifiers and at least one of the plurality of received hierarchical identifiers;
storing, at the user device, selected ones of the plurality of levels of received hierarchical identifiers and a selected team identifier from the received team identifiers;
comparing, at the user device, the first hierarchical identifier and the first team identifier with the selected ones of the plurality of levels of received hierarchical identifiers and the selected team identifier; and
based on the comparing, generating, at the user device, a second screen display, the second screen display including metadata for the first content and tuning to the first content in response to a selection from the screen display.

2. The method as recited in claim 1 wherein generating the first screen display comprises displaying received team identifier descriptors in a menu and wherein storing comprises storing the selected team identifier based on selections of received team identifier descriptors from the menu.

3. The method as recited in claim 1 wherein receiving comprises receiving hierarchical identifiers comprising a quaternary level unique to the tertiary level.

4. The method as recited in claim 1 wherein receiving comprises receiving at least one of the plurality of received hierarchical identifiers comprising a quaternary level corresponding to a division or conference of the conference, division or tournament of the tertiary level.

5. The method as recited in claim 1 wherein generating the second screen display comprises generating a recommendations list based on comparing.

6. The method as recited in claim 1 wherein prior to generating the second screen display, storing content based on comparing in the user device to form stored content, and wherein generating the screen display comprises generating the screen display comprising content descriptors for the stored content.

7. The method as recited in claim 1 further comprising displaying first hierarchical identifier descriptors corresponding to the primary level, selecting a first hierarchical identifier descriptor from a menu to form a first selected hierarchical identifier and wherein storing comprises storing the first selected hierarchical identifier corresponding to the first hierarchical descriptor.

8. The method as recited in claim 7 further comprising displaying second hierarchical identifier descriptors corresponding to the secondary level, selecting a second hierarchical identifier descriptor to form a second selected hierarchical identifier and wherein storing comprises storing a second selected hierarchical identifier corresponding to the second hierarchical descriptor.

9. A method comprising:
at a content processing system, storing a first team identifier associated with a first content and a first hierarchical identifier associated with the first content;
communicating, from the content processing system, the first team identifier and the first hierarchical identifier with first content metadata to a user device;
receiving, at the user device, the first team identifier, the first hierarchical identifier, the first content metadata, team identifiers to form received team identifiers and hierarchical identifiers to form a plurality of received hierarchical identifiers, at least one of the plurality of received hierarchical identifiers comprising a plurality of levels comprising a primary level corresponding to a sport and a secondary level corresponding to a league or organization of the sport and a tertiary level corresponding to a division conference or tournament of the organization or league of the secondary level;
generating a first screen display on a display associated with the user device comprising the received team identifiers and at least one of the plurality of received hierarchical identifiers;

storing, at the user device, selected ones of the plurality of levels of received hierarchical identifiers and a selected team identifier from the received team identifiers;

comparing, at the user device, the first hierarchical identifier and the first team identifier with the selected ones of the plurality of levels of received hierarchical identifiers and the selected team identifier; and based on the comparing, recording content at the user device corresponding to at least one of the selected ones of the levels primary level and secondary level based on comparing to form recorded content.

10. The method as recited in claim 9 further comprising generating a screen display comprising the recorded content.

11. The method as recited in claim 9 wherein receiving comprises receiving hierarchical identifiers comprising a quaternary level unique to the tertiary level.

12. The method as recited in claim 9 wherein receiving comprises receiving at least one of the plurality of received hierarchical identifiers comprising a quaternary level corresponding to a division or conference of the conference, division or tournament of the tertiary level.

13. The method as recited in claim 9 further comprising displaying first hierarchical identifier descriptors corresponding to the primary level, selecting a first hierarchical identifier descriptor from a menu to form a first selected hierarchical identifier and wherein storing comprises storing the first selected hierarchical identifier corresponding to the first hierarchical descriptor.

14. The method as recited in claim 13 further comprising displaying second hierarchical identifier descriptors corresponding to the secondary level, selecting a second hierarchical identifier descriptor to form a second selected hierarchical identifier and wherein storing comprises storing a second selected hierarchical identifier corresponding to the second hierarchical descriptor.

15. A user device comprising:

a search session manager receiving a first team identifier associated with a first content and a first hierarchical identifier associated with the first content communicated with first content metadata associated with the first content, receiving team identifiers to form received team identifiers and the hierarchical identifiers to form a plurality of received hierarchical identifiers, at least one of the plurality of received hierarchical identifiers comprising a plurality of levels comprising a primary level corresponding to a sport and a secondary level corresponding to a league or organization of the sport and a tertiary level corresponding to a division conference or tournament of the organization or league of the secondary level;

a first screen display displaying the received team identifiers and at least one of the plurality of received hierarchical identifiers;

a memory storing selected ones of the plurality of levels of the received hierarchical identifiers and a selected team identifier;

a search module comparing the hierarchical identifier and the first team identifier with the selected ones of the plurality of levels of the received hierarchical identifiers and the selected team identifier;

a second screen display displaying metadata for the first content based on the comparing; and a tuner tuning to the first content in response to a selection from the screen display.

16. The user device as recited in claim 15 wherein at least one of the received the metadata comprises the hierarchical identifiers comprises a comprising the primary level, the secondary level and the tertiary level is unique to the secondary level.

17. The user device as recited in claim 16 further comprising a quaternary level unique to the tertiary level.

18. The user device as recited in claim 15 wherein the second screen display comprises a recommendations list.

19. The user device as recited in claim 15 wherein the second screen display comprises content descriptors for recorded content.

* * * * *